US012638028B2

(12) United States Patent
Michalsky et al.

(10) Patent No.: US 12,638,028 B2
(45) Date of Patent: May 26, 2026

(54) APPARATUS FOR CONTROL OF MULTIPLE FLUID POWERED ACTUATORS

(71) Applicant: Universal City Studios LLC, Universal City, CA (US)

(72) Inventors: Jeffrey John Michalsky, Temple Terrace, FL (US); Nathaniel Even, Orlando, FL (US); Kolin Ernest Hundertmark, Ocoee, FL (US); John Reece Attwood, Orlando, FL (US); Boyd Rendell Howell, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/973,847

(22) Filed: Dec. 9, 2024

(65) Prior Publication Data

US 2025/0214529 A1        Jul. 3, 2025

Related U.S. Application Data

(60) Provisional application No. 63/616,000, filed on Dec. 29, 2023.

(51) Int. Cl.
*F15B 15/20*        (2006.01)
*B60R 22/195*        (2006.01)

(52) U.S. Cl.
CPC ........ *F15B 15/202* (2013.01); *B60R 22/1954* (2013.01)

(58) Field of Classification Search
CPC ................ B60R 22/03; B60R 22/1954; B60R 2022/282; B60R 21/00; B60R 21/02;
(Continued)

(56) References Cited

U.S. PATENT DOCUMENTS 4,531,459 A        7/1985  Yamada
9,611,619 B1 *     4/2017  Zimmerman ........... F15B 1/027
(Continued)

FOREIGN PATENT DOCUMENTS

EP        3061976 A1        8/2016

OTHER PUBLICATIONS

PCT/US2024/062133 International Search Report and Written Opinion mailed Mar. 20, 2025.

*Primary Examiner* — William H Rodriguez
(74) *Attorney, Agent, or Firm* — Fletcher Yoder, P.C.

(57)        ABSTRACT

A passenger restraint apparatus includes a plurality of fluid powered actuators and multiple switchable valves. Each fluid powered actuator includes a movable element, a first fluid chamber and a second fluid chamber, wherein the movable element moves in a first direction when a fluid flows into the first fluid chamber or in a second direction when the fluid flows into the second fluid chamber. A switchable valve includes a first port and a second port, the first port coupled to the first fluid chamber of each fluid powered actuator and the second port coupled to the second fluid chamber of each fluid powered actuator via separate one-way valves to enable movement of the movable element of each fluid powered actuator in the first direction and to prevent movement of the movable element of each fluid powered actuator in the second direction when the switchable valve is in an ON state.

20 Claims, 19 Drawing Sheets

(58) Field of Classification Search
 CPC ..... B60R 21/26; B60R 21/261; B60R 21/263;
   B60R 21/0097; B60R 2021/0051; B60R
   2021/0053; F15B 15/202; F15B 11/16;
   F15B 11/024; F15B 2211/212; F15B
   2211/30515; F15B 2211/3058; F15B
   2211/327; F15B 2211/625; F15B
   2211/7053; F15B 2211/7128; F15B
   2011/0243; A63G 7/00; A63G 31/00
 See application file for complete search history.

(56)                References Cited

U.S. PATENT DOCUMENTS

| | | | |
|---|---|---|---|
| 11,135,988 | B2 | 10/2021 | Zürcher et al. |
| 2007/0209502 | A1* | 9/2007 | Pasquali ................. F15B 7/006 |
| | | | 91/165 |
| 2009/0020964 | A1* | 1/2009 | Germain ........... B60G 21/0555 |
| | | | 280/5.506 |
| 2016/0076558 | A1* | 3/2016 | Gomm ................. F15B 13/044 |
| | | | 60/431 |
| 2022/0227321 | A1* | 7/2022 | Wiebeck ................. A63G 7/00 |
| 2023/0417263 | A1* | 12/2023 | Grooters ........... B65D 90/0033 |
| 2024/0084823 | A1* | 3/2024 | Kondo ................. E02F 9/2267 |
| 2025/0074757 | A1* | 3/2025 | Walthers ................... B66F 9/20 |
| 2025/0137468 | A1* | 5/2025 | Shimada ................... F15B 3/00 |
| 2025/0137476 | A1* | 5/2025 | Li ......................... F15B 13/027 |
| 2025/0198428 | A1* | 6/2025 | Ohira ..................... F15B 11/05 |
| 2025/0236258 | A1* | 7/2025 | Ahle ...................... B60R 22/48 |
| 2025/0237321 | A1* | 7/2025 | Ramprashad ....... F15B 13/0402 |

* cited by examiner

APPARATUS FOR CONTROL OF MULTIPLE FLUID POWERED ACTUATORS

CROSS REFERENCE TO RELATED APPLICATION

This application claims priority to and the benefit of U.S. Provisional Application Ser. No. 63/616,000, entitled "APPARATUS FOR CONTROL OF MULTIPLE FLUID POWERED ACTUATORS" and filed on Dec. 29, 2023, the entire content of which is incorporated herein by reference as if fully set forth below in its entirety and for all applicable purposes.

TECHNICAL FIELD

The technology discussed below relates generally to an apparatus for control of multiple fluid powered actuators.

INTRODUCTION

Ride vehicles, such as ride vehicles found in theme parks, typically include restraint systems (e.g., lap bars) to ensure the safety of passengers of the ride vehicles. In some examples, the restraint systems may implement fluid powered actuators (e.g., hydraulic cylinders) to facilitate engagement and/or disengagement of the restraint systems. The mechanisms used to control each of the fluid powered actuators may include multiple components, such as switchable valves and circuitry for controlling the switchable valves. These components may add to the cost or control complexity of the restraint systems as the number of ride vehicles and/or the size of each ride vehicle is increased.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure are related to a passenger restraint apparatus. In one example, the apparatus includes a plurality of fluid powered actuators, wherein each fluid powered actuator of the plurality of fluid powered actuators includes a movable element, a first fluid chamber and a second fluid chamber, wherein the movable element is configured to move in a first direction when a fluid flows into the first fluid chamber or in a second direction when the fluid flows into the second fluid chamber. The apparatus further includes a first switchable valve including at least a first port and a second port, wherein the first port is coupled to the first fluid chamber of each fluid powered actuator of the plurality of fluid powered actuators, and wherein the second port is coupled to the second fluid chamber of each fluid powered actuator of the plurality of fluid powered actuators via separate one-way valves to enable movement of the movable element of each fluid powered actuator of the plurality of fluid powered actuators in the first direction and to prevent movement of the movable element of each fluid powered actuator of the plurality of fluid powered actuators in the second direction when the first switchable valve is in an ON state.

In one example, the apparatus includes a first fluid powered actuator including a first movable element, a first fluid chamber and a second fluid chamber, wherein the first movable element is configured to move in a first direction when a fluid flows into the first fluid chamber or in a second direction when the fluid flows into the second fluid chamber, and a second fluid powered actuator including a second movable element, a third fluid chamber and a fourth fluid chamber, wherein the second movable element is configured to move in a third direction when the fluid flows into the third fluid chamber or in a fourth direction when the fluid flows into the fourth fluid chamber. The apparatus further includes a first switchable valve including at least a first port and a second port, wherein the first port is coupled to the first fluid chamber and the third fluid chamber, wherein the second port is coupled to the second fluid chamber via a first one-way valve to enable movement of the first movable element in the first direction and to prevent movement of the first movable element in the second direction when the first switchable valve is in an ON state, and wherein the second port is further coupled to the fourth fluid chamber via a second one-way valve to enable movement of the second movable element in the third direction and to prevent movement of the second movable element in the fourth direction when the first switchable valve is in the ON state.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements.

Aspects of the present disclosure are related to mechanisms for controlling multiple fluid powered actuators. In some examples, the multiple fluid powered actuators may be implemented in restraint systems (e.g., lap bar systems) of ride vehicles. In some nonlimiting examples, the fluid powered actuators may be hydraulic cylinders that are configured to facilitate engagement and/or disengagement of the restraint systems.

Figure 1C:
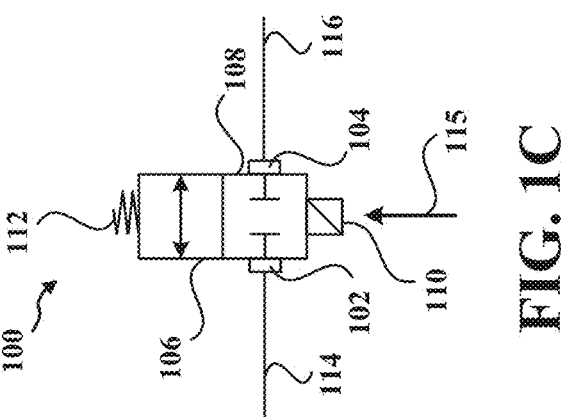
FIGS. 1A, 1B, and 1C illustrate operation of a two-way valve in accordance with various aspects of the disclosure.
Figure 1B:
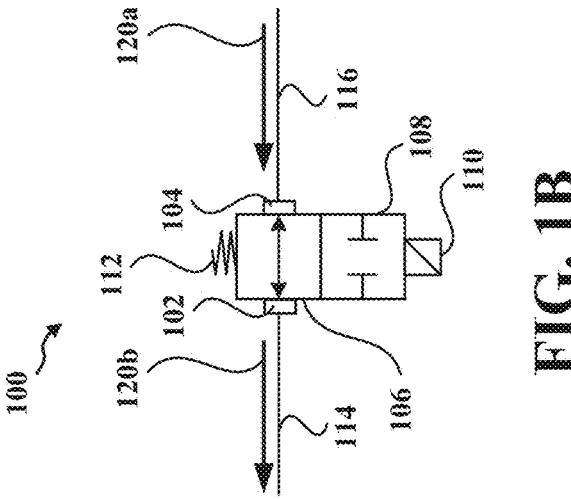
Figure 1A:
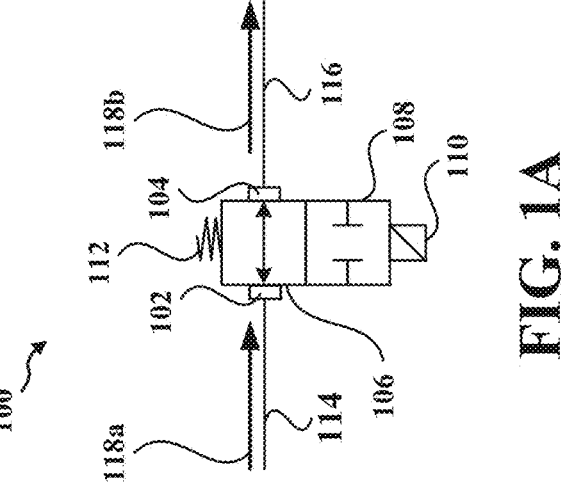

FIGS. 1A, 1B, and 1C illustrate operation of a two-way valve 100. The two-way valve 100 may control a flow of fluid, such as a liquid (e.g., a hydraulic liquid, oil, water, etc.), a gas, or other type of fluid. With reference to FIG. 1A, the two-way valve 100 may include a first port 102 and a second port 104. As shown in FIG. 1A, when the two-way valve 100 is in a first position 106, the first port 102 is connected to the second port 104 and fluid may flow between the first and second ports 102, 104. In some examples, the two-way valve 100 may be considered to be in an ON state when the two-way valve 100 is in the first position 106. The two-way valve 100 may be referred to as a switchable valve.

In one example, a fluid may enter the two-way valve 100 through a first fluid path 114 and the first port 102 in a first direction indicated by arrow 118a and may exit the two-way valve 100 through the second port 104 and a second fluid path 116 in the first direction indicated by arrow 118b. In another example, with reference to FIG. 1B, the fluid may enter the two-way valve 100 through the second fluid path 116 and the second port 104 in a second direction indicated by arrow 120a and may exit the two-way valve 100 through the first port 102 and the first fluid path 114 in the second direction indicated by arrow 120b.

As shown in FIG. 1C, the two-way valve 100 may switch to a second position 108. When the two-way valve 100 is in the second position 108, the first port 102 is disconnected from the second port 104 and fluid may not flow between the first and second ports 102, 104. In some examples, the two-way valve 100 may be considered to be in an OFF state when the two-way valve 100 is in the second position 108.

In the implementation of FIGS. 1A, 1B, 1C, the two-way valve 100 may include a solenoid 110 and a spring 112. The solenoid 110 may enable switching between the first and second positions 106, 108. For example, with reference to FIG. 1C, when the solenoid 110 is energized, the solenoid 110 may provide a force 115 that enables the two-way valve 100 to switch from the first position 106 to the second position 108. When the solenoid 110 is no longer energized, the spring 112 may cause the two-way valve 100 to switch back to the first position 106 as shown in FIGS. 1A and 1B.

Figures 2A, 2B, 2C:
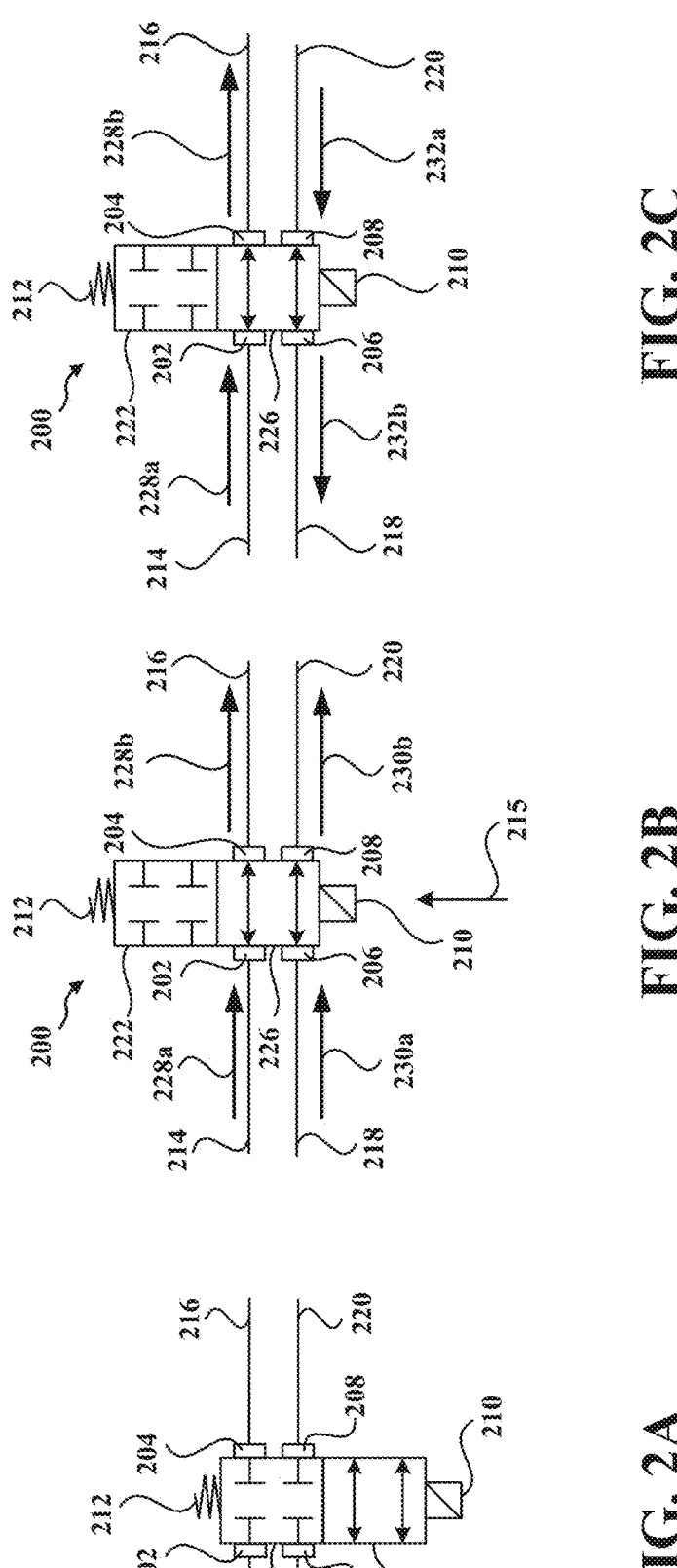
FIGS. 2A, 2B, and 2C illustrate operation of a four-way valve in accordance with various aspects of the disclosure.

FIGS. 2A, 2B, and 2C illustrate operation of a four-way valve 200. The four-way valve 200 may control a flow of fluid, such as a liquid (e.g., a hydraulic liquid, oil, water, etc.), a gas, or other suitable type of fluid. With reference to FIG. 2A, the four-way valve 200 may include a first port 202, a second port 204, a third port 206, and a fourth port 208. The first port 202 may be coupled to a first fluid path 214, the second port 204 may be coupled to a second fluid path 216, the third port 206 may be coupled to a third fluid path 218, and the fourth port 208 may be coupled to a fourth fluid path 220. The four-way valve 200 may include two positions, such as a first position 222 and a second position 226.

As shown in FIG. 2A, when the four-way valve 200 is in the first position 222, the first port 202 is disconnected from the second port 204 and fluid may not flow between the first and second ports 202, 204. Moreover, the third port 206 is disconnected from the fourth port 208 and fluid may not flow between the third and fourth ports 206, 208. Therefore, the four-way valve 200 may be said to be in an OFF state when in the first position 222.

As shown in FIG. 2B, when the four-way valve 200 is in the second position 226, the first port 202 is connected to the second port 204 and fluid may flow between the first and second ports 202, 204. Moreover, the third port 206 is connected to the fourth port 208 and fluid may flow between the third and fourth ports 206, 208. Therefore, the four-way valve 200 may be said to be in an ON state when in the second position 226.

In one example, with reference to FIG. 2B, a fluid may enter the four-way valve 200 through the first fluid path 214 and the first port 202 in a first direction indicated by arrow 228a and may exit the four-way valve 200 through the second port 204 and the second fluid path 216 in the first direction indicated by arrow 228b. It should be understood that a fluid may flow between the first and second ports 202, 204 in an opposite direction (e.g., from the second port 204 to the first port 202) in other examples.

A fluid may enter the four-way valve 200 through the third fluid path 218 and the third port 206 in the first direction indicated by arrow 230a and may exit the four-way valve 200 through the fourth port 208 and the fourth fluid path 220 in the first direction indicated by arrow 230b. It should be understood that a fluid may flow between the third and fourth ports 206, 208 in an opposite direction (e.g., from the fourth port 208 to the third port 206) in other examples.

A flow direction of a fluid between the first and second ports 202, 204 may be independent of a flow direction of a fluid between the third and fourth ports 206, 208. For example, with reference to FIG. 2C, a fluid may enter the four-way valve 200 through the first fluid path 214 and the first port 202 in a first direction indicated by arrow 228a and may exit the four-way valve 200 through the second port 204 and the second fluid path 216 in the first direction indicated by arrow 228b. A fluid may enter the four-way valve 200 through the fourth fluid path 220 and the fourth port 208 in a second direction indicated by arrow 232a and may exit the four-way valve 200 through the third port 206 and the third fluid path 218 in the second direction indicated by arrow 232b.

In the implementation of FIGS. 2A, 2B, 2C, the four-way valve 200 may include a solenoid 210 and a spring 212. The solenoid 210 may enable switching between the first and second positions 222, 226. For example, with reference to FIG. 2B, when the solenoid 210 is energized, the solenoid 210 may provide a force 215 that enables the four-way valve 200 to switch from the first position 222 to the second position 226. When the solenoid 210 is no longer energized, the spring 212 may cause the four-way valve 200 to switch back to the first position 222 as shown in FIG. 2A. The four-way valve 200 may be referred to as a switchable valve.

Figure 3B:
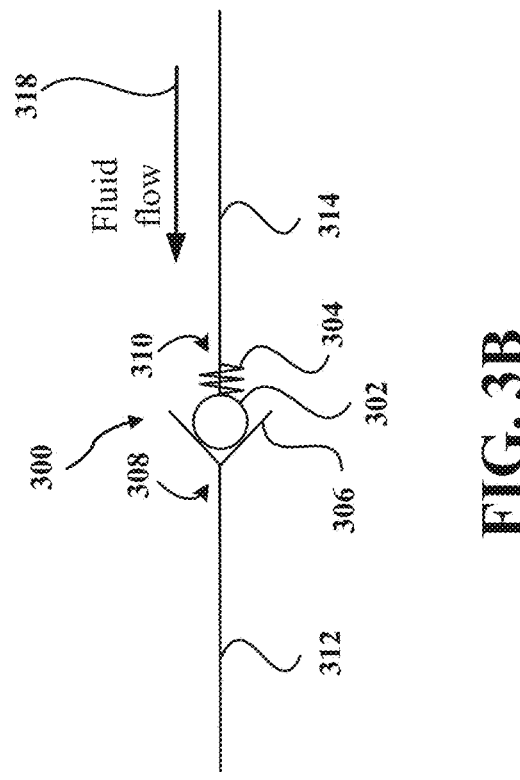
FIGS. 3A and 3B illustrate operation of a one-way valve in accordance with various aspects of the disclosure.
Figure 3A:
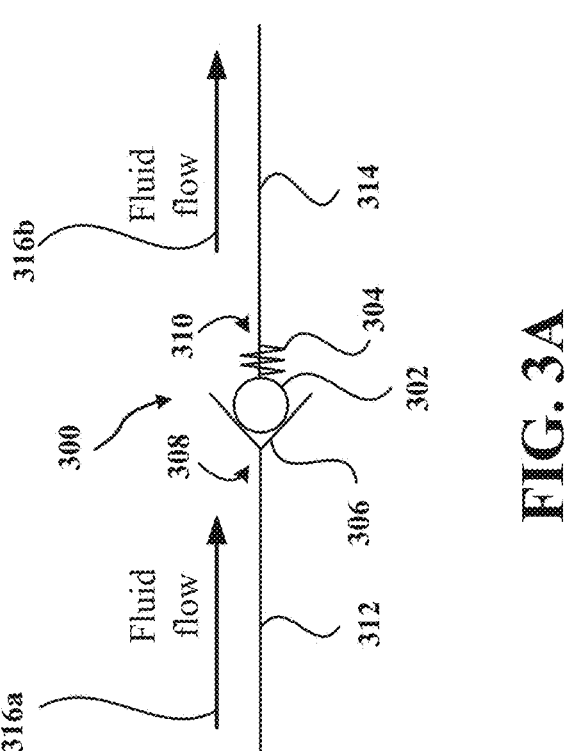

FIGS. 3A and 3B illustrate operation of a one-way valve 300. The one-way valve 300 may control a flow of fluid, such as a liquid (e.g., a hydraulic liquid, oil, water, etc.), a gas, or other type of fluid. The one-way valve 300 may also be referred to as a check valve or a non-return valve. In FIG. 3A, the one-way valve 300 may include an inlet 308 and an outlet 310. When a fluid enters the one-way valve 300 via the inlet 308 through a first fluid path 312 in a first direction indicated by arrow 316a, a ball 302 may be pushed away from a valve seat 306 (e.g., pushed in the direction of the arrow 316a). This may enable the fluid to flow out of one-way valve 300 via the outlet 310 through a second fluid path 314 in the first direction indicated by arrow 316b.

In some implementations, and as shown in FIG. 3A, the ball 302 may be coupled to a spring 304. For example, when the fluid enters the one-way valve 300 via the inlet 308 through the first fluid path 312 in the first direction indicated by arrow 316a and pushes the ball 302 away from the valve seat 306, the spring 304 may be in a compressed state. When the fluid no longer flows in the first direction indicated by arrow 316a, the spring 304 may push the ball 302 against the valve seat 306 to close the one-way valve 300. As described herein with reference to FIG. 3B, when the ball 302 is pushed against the valve seat 306, the one-way valve 300 may prevent flow of the fluid from the outlet 310 to the inlet 308.

In FIG. 3B, when the fluid enters the one-way valve 300 via the outlet 310 through the second fluid path 314 in the second direction indicated by arrow 318, the fluid may push the ball 302 into the valve seat 306. This may prevent the fluid from flowing out of the one-way valve 300 via the inlet 308.

Figure 4A:
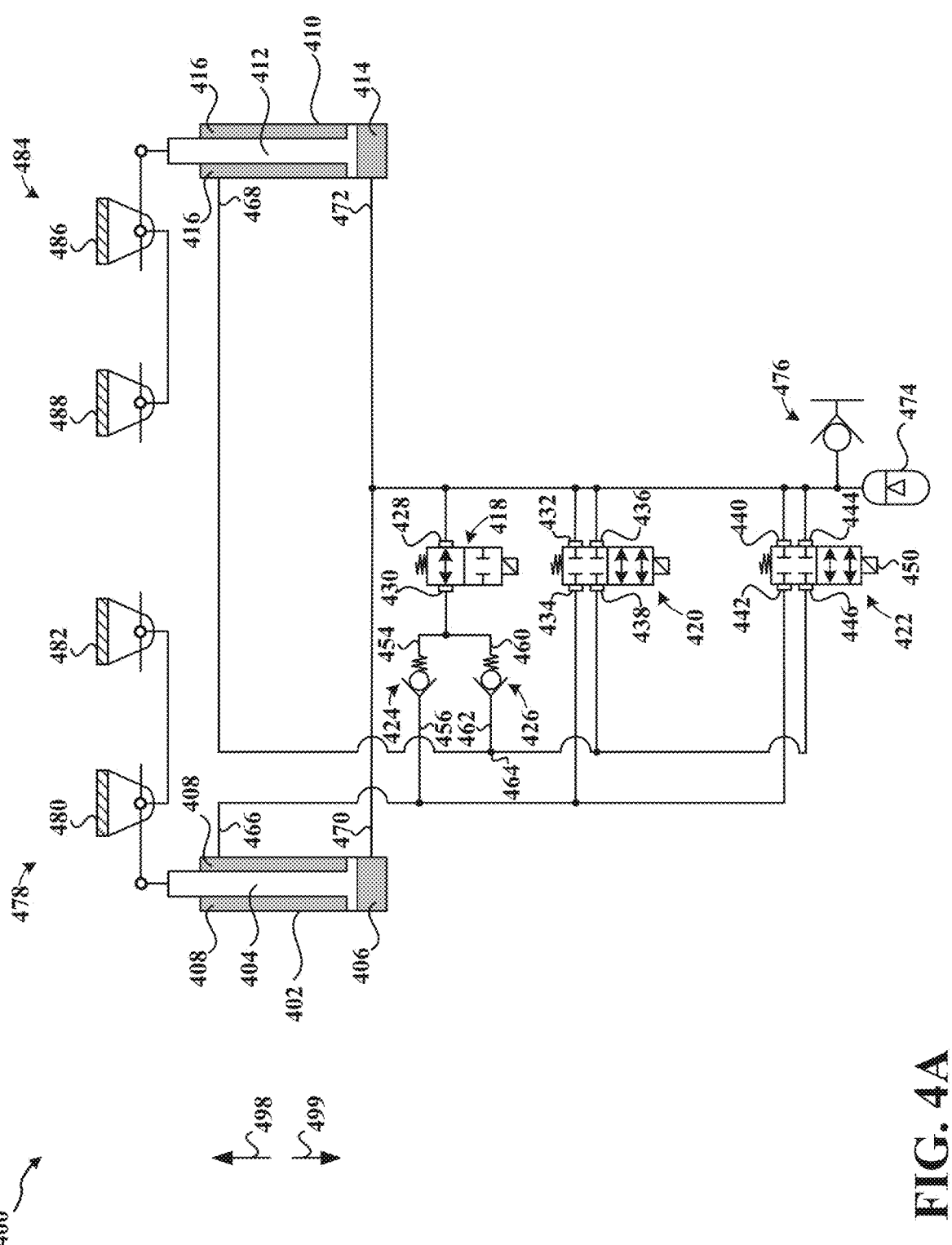
FIGS. 4A, 4B, 4C, 4D, 4E, 4F, 4G, 4H, 4I, and 4J illustrate operation of a passenger restraint apparatus in accordance with various aspects of the disclosure.

FIGS. 4A, 4B, 4C, 4D, 4E, 4F, 4G, 4H, 4I and 4J illustrate operation of a passenger restraint apparatus 400 in accordance with various aspects. With reference to FIG. 4A, the passenger restraint apparatus 400 includes a first fluid powered actuator 402, a second fluid powered actuator 410, a first one-way valve 424, a second one-way valve 426, a third one-way valve 476, a first switchable valve 418, a second switchable valve 420, a third switchable valve 422, a fluid accumulator 474, a first passenger restraint 478, and a second passenger restraint 484. In an aspect, the third switchable valve 422 is optional, and therefore, implementation of the third switchable valve 422 is not necessary to enable operation of the apparatus.

The first fluid powered actuator 402 includes a movable element 404, a first fluid chamber 406 and a second fluid chamber 408. The movable element 404 is configured to move in a first direction (e.g., in a direction of arrow 498) when a fluid flows into the first fluid chamber 406 or in a second direction (e.g., in a direction of arrow 499) when the fluid flows into the second fluid chamber 408.

The second fluid powered actuator 410 includes a movable element 412, a first fluid chamber 414 and a second fluid chamber 416. The movable element 412 is configured to move in a third direction (e.g., in a direction of arrow 498) when the fluid flows into the first fluid chamber 414 or in a fourth direction (e.g., in a direction of arrow 499) when the fluid flows into the second fluid chamber 416.

The first switchable valve 418 may be implemented as a two-way valve, such as the two-way valve 100 described with reference to FIGS. 1A through IC. The first switchable valve 418 includes multiple ports, such as a first port 428 and a second port 430. The first port 428 is coupled to the first fluid chamber 406 of the first fluid powered actuator 402 and the first fluid chamber 414 of the second fluid powered actuator 410. The second port 430 is coupled to the second fluid chamber 408 of the first fluid powered actuator 402 via the first one-way valve 424. The second port 430 is further coupled to the second fluid chamber 416 of the second fluid powered actuator 410 via the second one-way valve 426.

The second switchable valve 420 may be implemented as a four-way valve, such as the four-way valve 200 described with reference to FIGS. 2A through 2C. The second switchable valve 420 includes multiple ports, such as a first port 432, a second port 434, a third port 436, and a fourth port 438. The first port 432 and the third port 436 are both coupled to the first fluid chamber 406 of the first fluid powered actuator 402 and the first fluid chamber 414 of the second fluid powered actuator 410. The second port 434 is coupled to the second fluid chamber 408 of the first fluid powered actuator 402. The fourth port 438 is coupled to the second fluid chamber 416 of the second fluid powered actuator 410.

The third switchable valve 422 may be implemented as a four-way valve, such as the four-way valve 200 described with reference to FIGS. 2A through 2C. The second switchable valve 422 includes multiple ports, such as a first port 440, a second port 442, a third port, 444, and a fourth port 446. The first port 440 and the third port 444 are both coupled to the first fluid chamber 406 of the first fluid powered actuator 402 and the first fluid chamber 414 of the second fluid powered actuator 410. The second port 442 is coupled to the second fluid chamber 408 of the first fluid powered actuator 402. The fourth port 446 is coupled to the second fluid chamber 416 of the second fluid powered actuator 410.

The first fluid chamber 406 of the first fluid powered actuator 402 and the first fluid chamber 414 of the second fluid powered actuator 410 are coupled to the fluid accumulator 474 and the third one-way valve 476. The fluid accumulator 474 may be a device for storing a fluid under pressure and releasing the fluid as needed with a proper (e.g., consistent) flow. In some examples, the third one-way valve 476 may be used to fill the passenger restraint apparatus 400 with a fluid (e.g., a hydraulic fluid or other suitable fluid as described herein). In some examples, the third one-way valve 476 may serve as a test port to enable an operator to monitor, measure, and/or test a pressure or a condition of the fluid.

Figure 4B:
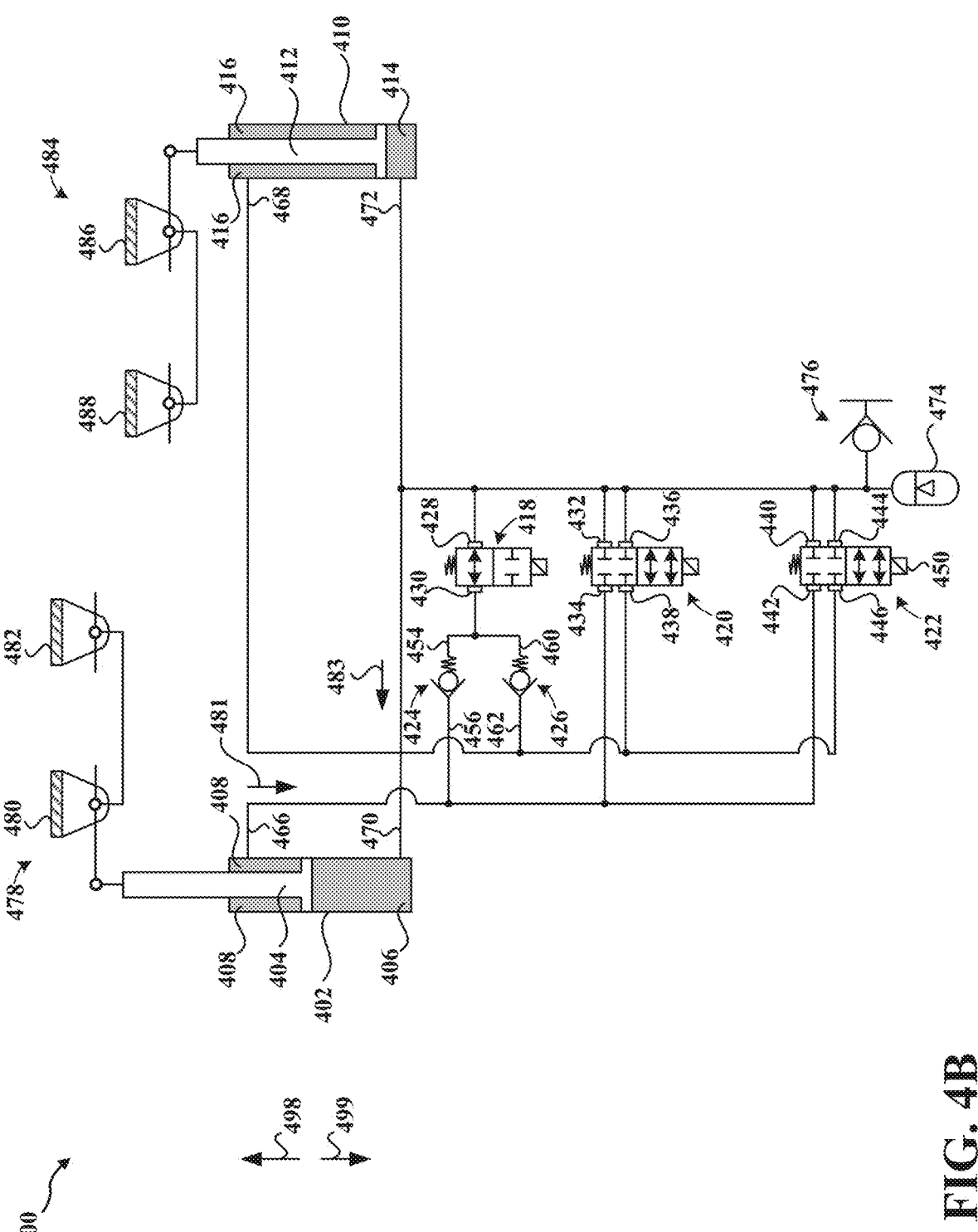

With reference to FIG. 4B, when the first switchable valve 418 is in an ON state (e.g., fluid is enabled to flow between the first and second ports 428, 430), the first one-way valve 424 may enable movement of the movable element 404 in the first direction (e.g., in a direction of arrow 498) and may prevent movement of the movable element 404 in the second direction (e.g., in a direction of arrow 499). For example, when the movable element 404 is moved in the first direction (e.g., in a direction of arrow 498), fluid may flow out of the second fluid chamber 408 of the first fluid powered actuator 402 through a fluid path 466 (as indicated with arrow 481) and may flow into the first fluid chamber 406 of the first fluid powered actuator 402 through a fluid path 470 (as indicated with arrow 483). In this scenario, the first one-way valve 424 will enable fluid flow from an inlet fluid path 456 to an outlet fluid path 454.

It should be noted that the movable element 404 cannot be moved in the second direction (e.g., in a direction of arrow 499) when the first switchable valve 418 is in an ON state and the second switchable valve 420 and the third switchable valve 422 are in an OFF state. For example, since the first one-way valve 424 will not allow fluid flow from the outlet fluid path 454 to the inlet fluid path 456, the first one-way valve 424 prevents fluid flow into the second fluid chamber 408, and consequently, out of the first fluid chamber 406 of the first fluid powered actuator 402. The movable element 404 cannot be moved in the second direction (e.g., in a direction of arrow 499) if fluid cannot flow out of the first fluid chamber 406 of the first fluid powered actuator 402.

Figure 4C:
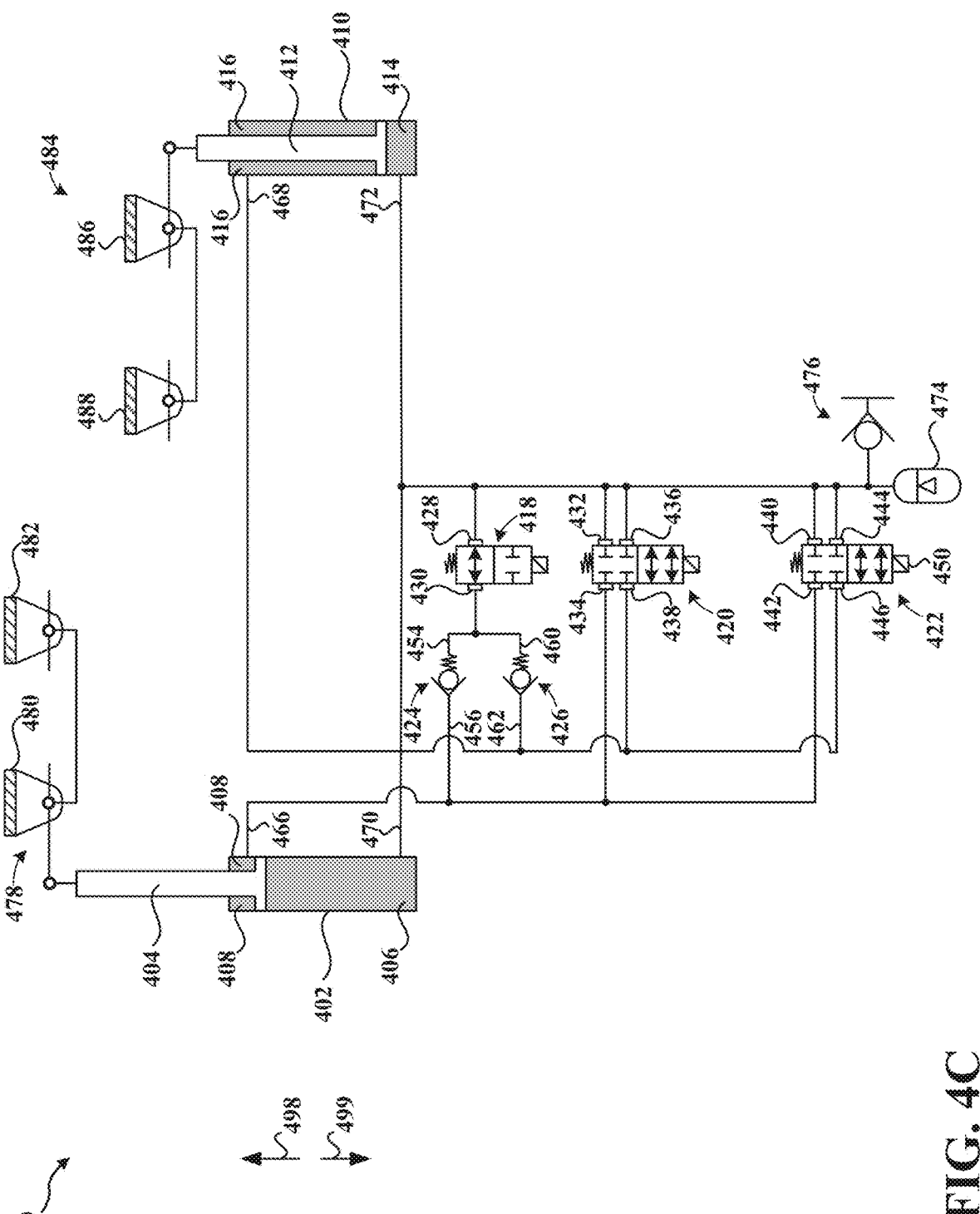

With reference to FIG. 4C, the movable element 404 may be moved in the first direction (e.g., in a direction of arrow 498) until full extension of the movable element 404 is achieved. The movable element 404 of the first fluid powered actuator 402 may be moved in the first direction (e.g., in a direction of arrow 498) independently of the movable element 412 of the second fluid powered actuator 410. In other words, a movement of the movable element 404 of the first fluid powered actuator 402 does not cause a movement of the movable element 412 of the second fluid powered actuator 410, and a movement of the movable element 412 of the second fluid powered actuator 410 does not cause a movement of the movable element 404 of the first fluid powered actuator 402.

Figure 4D:
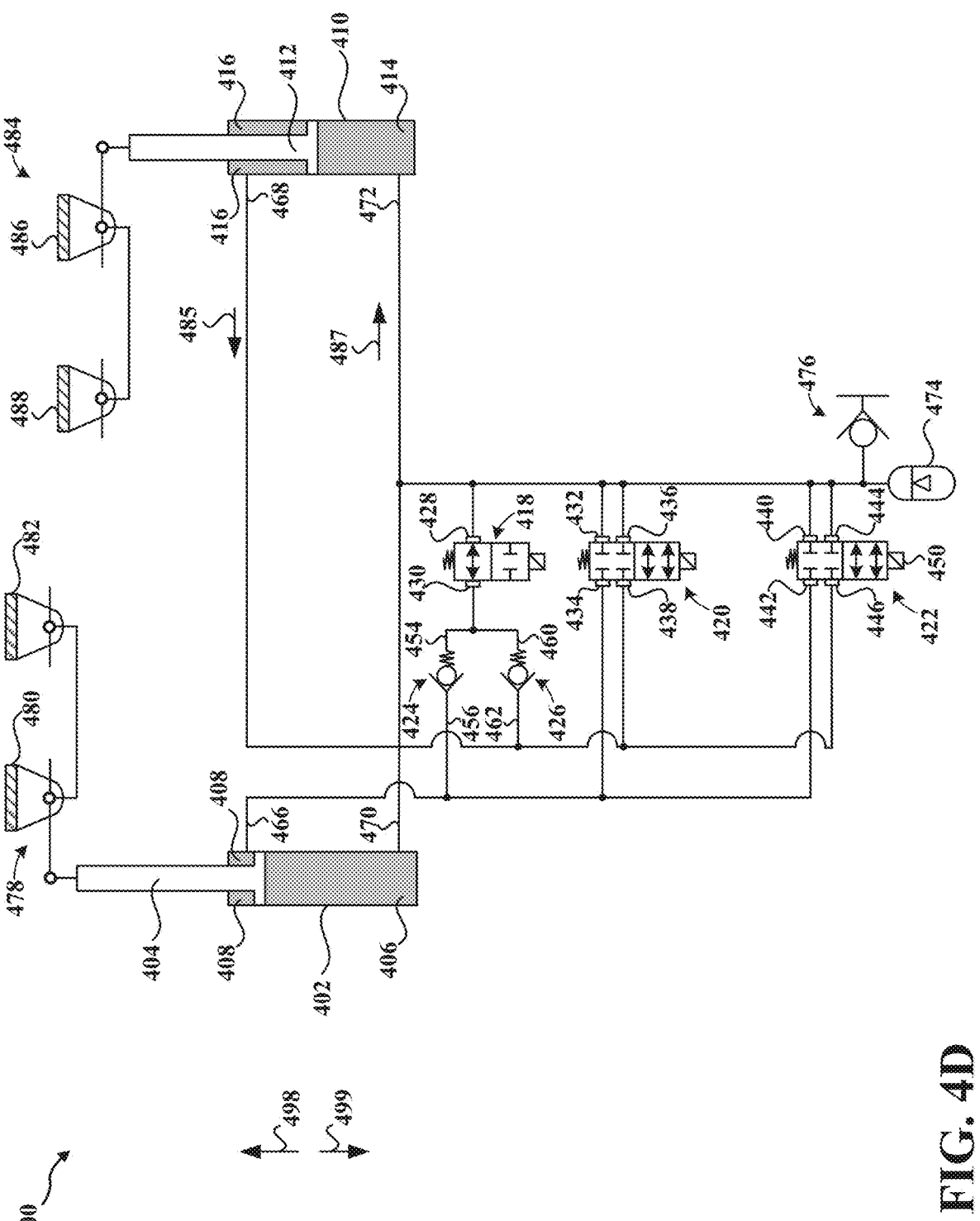

With reference to FIG. 4D, when the first switchable valve 418 is in an ON state (e.g., fluid is enabled to flow between the first and second ports 428, 430), the second one-way valve 426 may enable movement of the movable element 412 of the second fluid powered actuator 410 in the third direction (e.g., in a direction of arrow 498) and may prevent movement of the movable element 412 in the fourth direction (e.g., in a direction of arrow 499). For example, when the movable element 412 is moved in the third direction (e.g., in a direction of arrow 498), fluid may flow out of the second fluid chamber 416 of the second fluid powered actuator 410 through a fluid path 468 (as indicated with arrow 485) and may flow into the first fluid chamber 414 of the second fluid powered actuator 410 through a fluid path 472 (as indicated with arrow 487). In this scenario, the second one-way valve 426 will enable fluid flow from an inlet fluid path 462 to an outlet fluid path 460.

It should be noted that the movable element 412 cannot be moved in the fourth direction (e.g., in a direction of arrow 499) when the first switchable valve 418 is in an ON state and the second switchable valve 420 and the third switchable valve 422 are in an OFF state. For example, since the second one-way valve 426 will not allow fluid flow from the outlet fluid path 460 to the inlet fluid path 462, the second one-way valve 426 prevents fluid flow into the second fluid chamber 416, and consequently, out of the first fluid chamber 414 of the second fluid powered actuator 410. The movable element 412 cannot be moved in the fourth direction (e.g., in a direction of arrow 499) if fluid cannot flow out of the first fluid chamber 414 of the second fluid powered actuator 410.

Figure 4E:
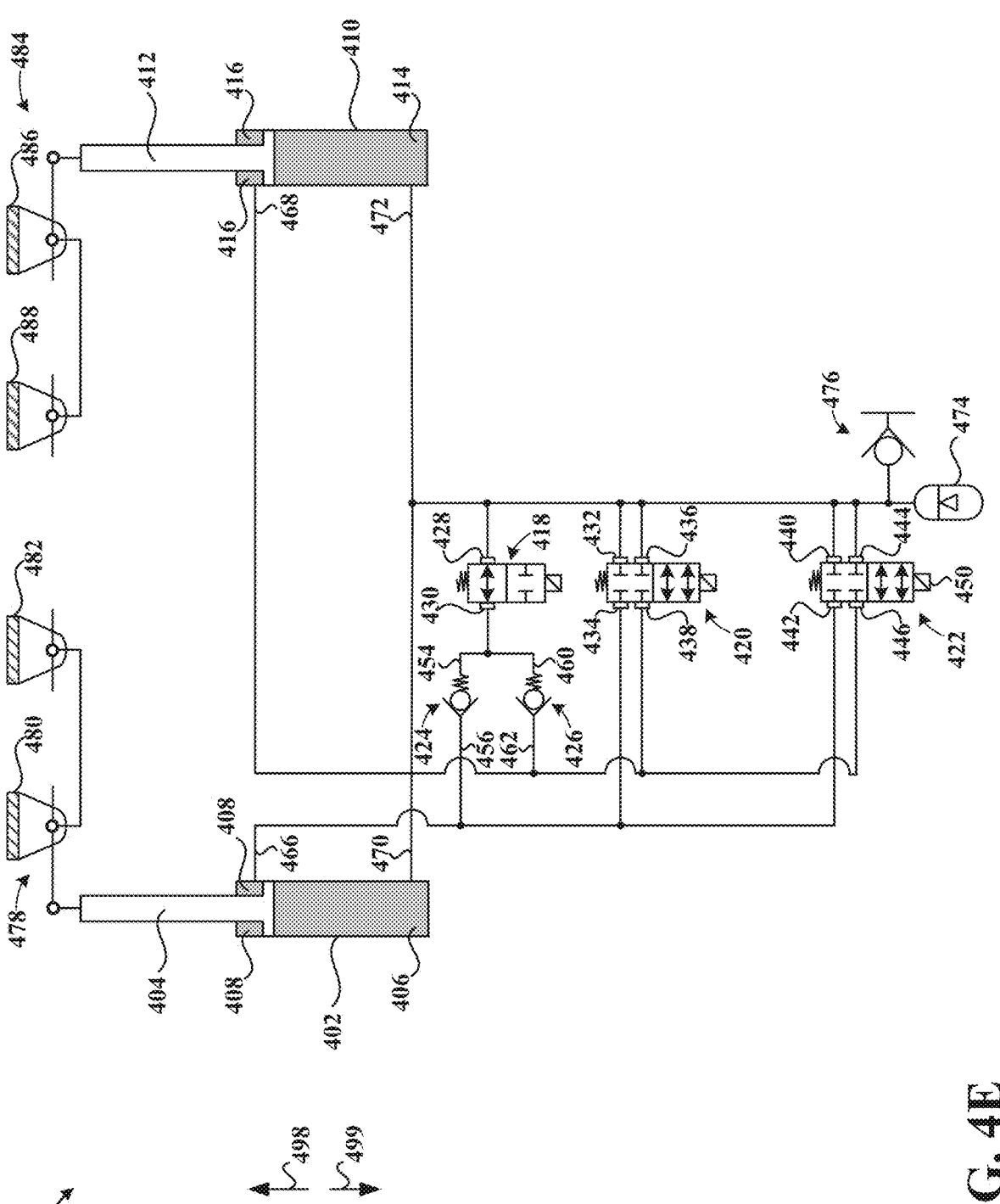

With reference to FIG. 4E, the movable element 412 may be moved in the third direction (e.g., in a direction of arrow 498) until full extension of the movable element 412 is achieved. The movable element 412 may be moved in the third direction (e.g., in a direction of arrow 498) independently of the movable element 404 of the first fluid powered actuator 402.

In some implementations, the first passenger restraint 478 may include one or more lap bars for a first row in a ride vehicle, such as a first lap bar 480 and/or a second lap bar 482. When the first passenger restraint 478 includes multiple lap bars (e.g., includes the first lap bar 480 and the second lap bar 482), then the multiple lap bars are configured to move together based on the movement of the movable element 404. The second passenger restraint 484 may include one or more lap bars for a second row in the ride vehicle, such as a first lap bar 486 and/or a second lap bar 488. When the second passenger restraint 484 includes multiple lap bars (e.g., includes the first lap bar 486 and the second lap bar 488), then the multiple lap bars are configured to move together based on the movement of the movable element 412. In some examples, the first passenger restraint 478 is engaged when the movable element 404 is moved in the first direction (e.g., in a direction of arrow 498) until passengers are secured or until full extension of the movable element 404 is achieved. In some examples, the second passenger restraint 484 is engaged when the movable element 412 is moved in the third direction (e.g., in a direction of arrow 498) until passengers are secured or until full extension of the movable element 412 is achieved.

During operation of the passenger restraint apparatus 400 when the first switchable valve 418 is in the ON state, since the movable element 404 of the first fluid powered actuator 402 is enabled to move in the first direction (e.g., in a direction of arrow 498) to engage the first passenger restraint 478 and cannot be moved in the second direction (e.g., in a direction of arrow 499) to disengage the first passenger restraint 478, passengers in a first row of a ride vehicle may not inadvertently or intentionally disengage the first passenger restraint 478. Similarly, since the movable element 412 of the second fluid powered actuator 410 is enabled to move in the third direction (e.g., in a direction of arrow 498) to engage the second passenger restraint 484 and cannot be moved in the fourth direction (e.g., in a direction of arrow 499) to disengage the second passenger restraint 484, passengers of a second row of the ride vehicle may not inadvertently or intentionally disengage the second passenger restraint 484. In some examples, the first switchable valve 418 may remain in the ON state when the ride vehicle is in operation, which may enable passengers to further engage the first and/or second passenger restraint 478, 484 (e.g., move the lap bars 480, 482, 486, 488 closer to the passenger(s)) during operation of the ride vehicle.

Figure 4F:
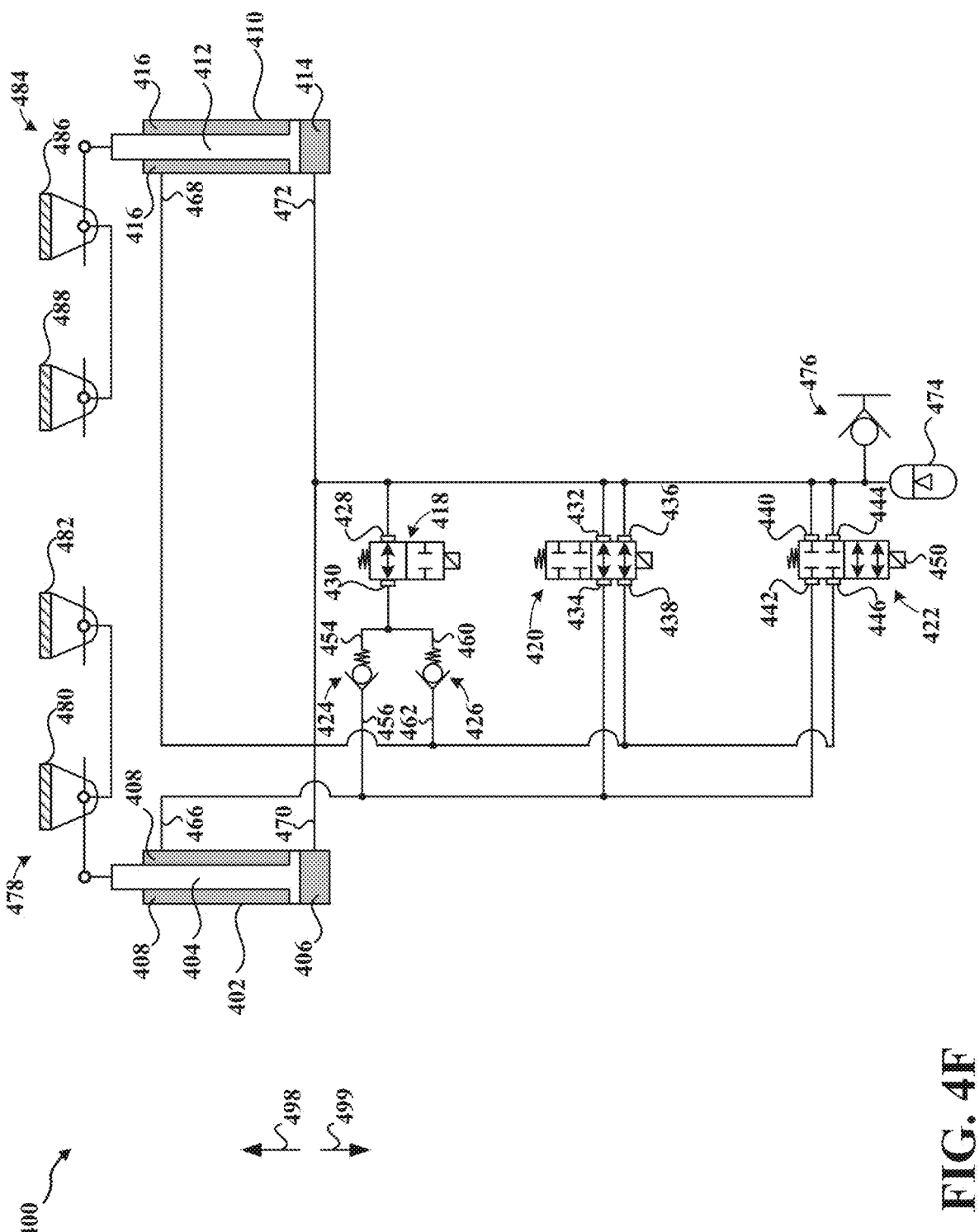

With reference to FIG. 4F, when the second switchable valve 420 is in an ON state (e.g., where the first port 432 is connected to the second port 434 to enable fluid flow between the first and second ports 432, 434, and where the third port 436 is connected to the fourth port 438 to enable fluid flow between the third and fourth ports 436, 438), the first and second movable elements 404, 412 may be independently moved. For example, the movable element 404 may be moved in the first direction (e.g., in a direction of arrow 498) or the second direction (e.g., in a direction of arrow 499), and the movable element 412 may be moved in the third direction (e.g., in a direction of arrow 498) or in the fourth direction (e.g., in a direction of arrow 499).

When the second switchable valve 420 is in an ON state, the first and second one-way valves 424, 426 are bypassed via the second switchable valve 420. This enables fluid to freely flow between the first and second fluid chambers 406, 408 of the first fluid powered actuator 402, and enables fluid to freely flow between the first and second fluid chambers 414, 416 of the second fluid powered actuator 410.

It should be noted that when the second switchable valve 420 is in the ON state, the movable elements 404, 412 may be independently moved despite the state of the first switchable valve 418. Therefore, in some examples, the second switchable valve 420 may be used to enable disengagement of the first and second passenger restraints 478, 484. For example, a control system of a ride vehicle may set the second switchable valve 420 to the ON state when passengers are ready to exit the ride vehicle.

Figure 4G:
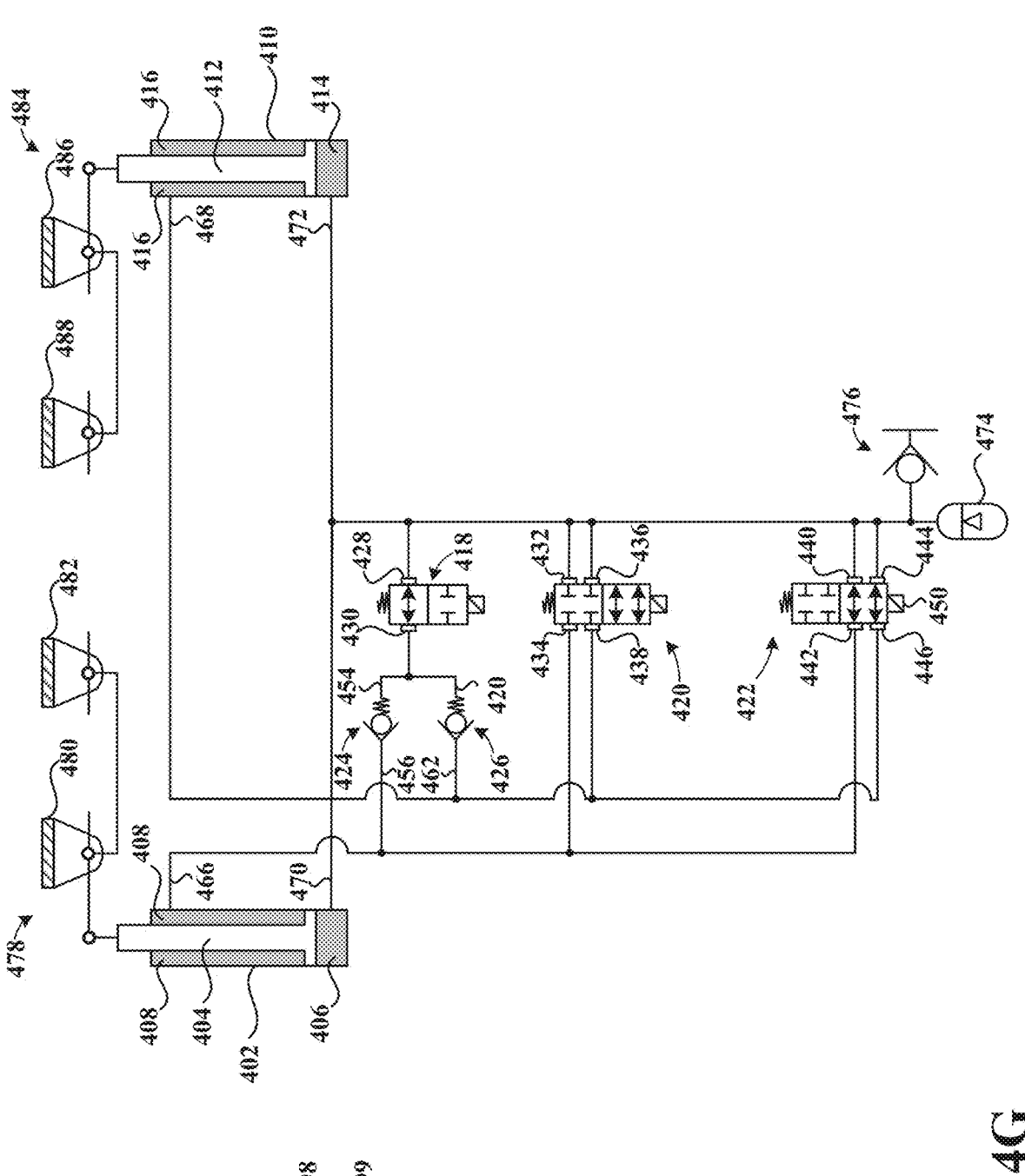

With reference to FIG. 4G, when the third switchable valve 422 is in an ON state (e.g., where the first port 440 is connected to the second port 442 to enable fluid flow between the first and second ports 440, 442, and where the third port 444 is connected to the fourth port 446 to enable fluid flow between the third and fourth ports 444, 446), the first and second movable elements 404, 412 may be independently moved. For example, the movable element 404 may be moved in the first direction (e.g., in a direction of arrow 498) or the second direction (e.g., in a direction of arrow 499), and the movable element 412 may be moved in the third direction (e.g., in a direction of arrow 498) or in the fourth direction (e.g., in a direction of arrow 499).

When the third switchable valve 422 is in an ON state, the first and second one-way valves 424, 426 are bypassed via the third switchable valve 422. This enables fluid to freely flow between the first and second fluid chambers 406, 408 of the first fluid powered actuator 402, and enables fluid to freely flow between the first and second fluid chambers 414, 416 of the second fluid powered actuator 410.

It should be noted that when the third switchable valve 422 is in the ON state, the movable elements 404, 412 may be independently moved despite the states of the first and second switchable valves 418, 420. Therefore, in some examples, the third switchable valve 422 may be used as an override (e.g., in an emergency situation) to enable disengagement of the first and second passenger restraints 478, 484. For example, an operator may be enabled to set the third switchable valve 422 to the ON state to manually release the first and second passenger restraints 478, 484 in scenarios where passengers need to evacuate the ride vehicle. Accordingly, in addition to, or alternative to, a solenoid 450 that enables switching between ON and OFF states of the third switchable valve 422 via an electric current, the third switchable valve 422 may include a mechanical switch or control that enables the operator to manually set the third switchable valve 422 to the ON or OFF state.

Figure 4H:
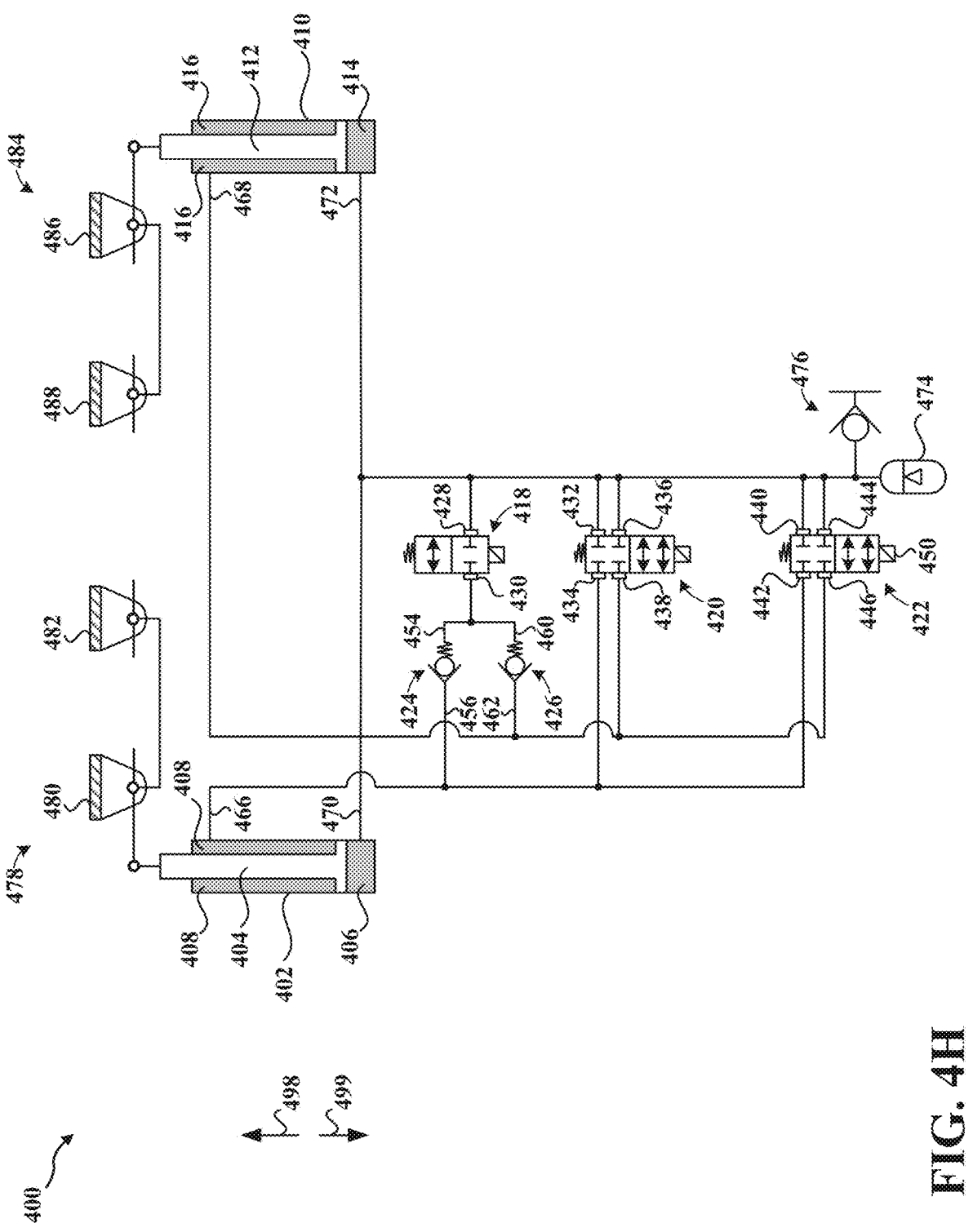

With reference to FIG. 4H, when the first switchable valve 418 is in an OFF state (e.g., fluid is not allowed to flow between the first and second ports 428, 430) and the second and third switchable valves 420, 422 are also in the OFF state, fluid cannot flow between the first and second fluid chambers 406, 408 of the first fluid powered actuator 402, and fluid cannot flow between the first and second fluid chambers 414, 416 of the second fluid powered actuator 410. Therefore, the movable elements 404, 412 and the first and second passenger restraints 478, 484 may not move. In some implementations, the first switchable valve 418 may be maintained in the OFF state to lock the movable elements 404, 412 and the first and second passenger restraints 478, 484 in their current positions.

In some scenarios, the first switchable valve 418, the second switchable valve 420, and the third switchable valve 422 may be maintained in the OFF state when the first and second passenger restraints 478, 484 are disengaged (e.g., when the first and second movable elements 404, 412 are fully or partially retracted as shown in FIG. 4H) to facilitate loading and/or unloading of passengers from the ride vehicle. This may prevent inadvertent or intentional engagement of the first and second passenger restraints 478, 484 during loading and/or unloading of passengers from the ride vehicle.

Figure 4I:
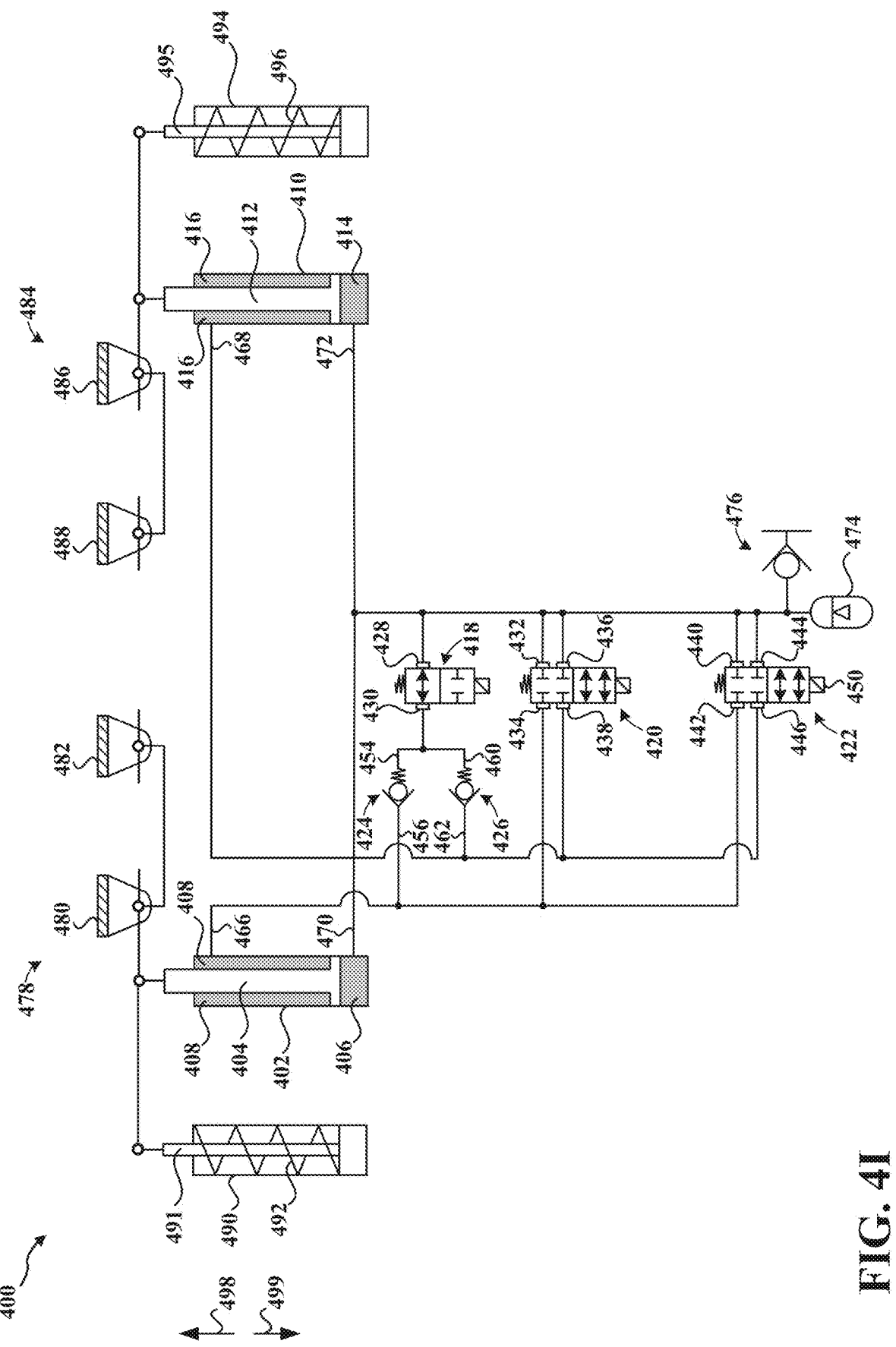

In some aspects, an assistance mechanism may be coupled to the first and/or second fluid powered actuator 402, 410. For example, with reference to FIG. 4I, a first assistance mechanism 490 may be coupled to the first fluid powered actuator 402 a second assistance mechanism 494 may be coupled to the second fluid powered actuator 410. In one nonlimiting example, the assistance mechanism 490, 494 may include a coil spring mechanism or a gas spring mechanism (also referred to as a gas strut). For example, the assistance mechanism 490 may include a rod 491 and a coil 492, where the rod 491 may move in the first or second direction. The rod 491 may be configured to extend in the first direction (e.g., in a direction of arrow 498) and retract in the second direction (e.g., in a direction of arrow 499). In the configuration of FIG. 4I, the rod 491 may retract with a force provided by a coil 492 to facilitate disengagement of the first passenger restraint 478.

Figure 4J:
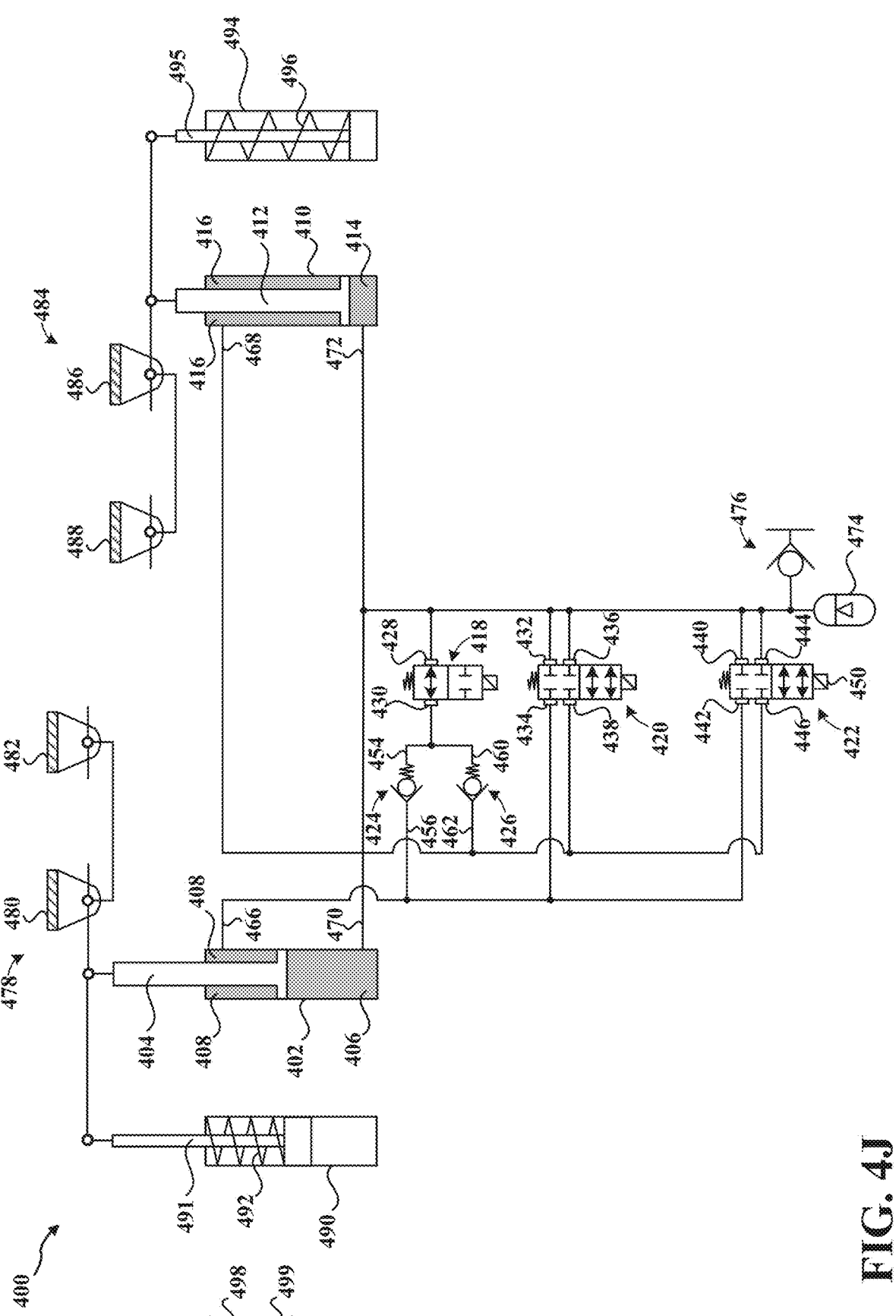

For example, with reference to FIG. 4J, the rod 491 may extend in the first direction (e.g., in a direction of arrow 498) as the first passenger restraint 478 is moved in the first direction. This may compress the coil spring 492, which may provide a force for retraction of the rod 491 in the second direction (e.g., in a direction of arrow 499).

As another example, the assistance mechanism 494 may include a rod 495 and a coil 496, where the rod 495 may move in the third or fourth direction. The rod 495 may be configured to extend in the third direction (e.g., in a direction of arrow 498) and retract in the fourth direction (e.g., in a direction of arrow 499). In the configuration of FIG. 4I, the rod 495 may retract with a force provided by a coil 496 to facilitate disengagement of the second passenger restraint 484.

In some aspects, the fluid accumulator 474 may take up any difference in a volume of the first fluid chamber (e.g., the first fluid chamber 406) and the second fluid chamber (e.g., the second fluid chamber 408) of a fluid powered actuator. In some examples, the fluid accumulator 474 may be pressurized to facilitate opening of a passenger restraint (e.g., the first passenger restraint 478 or the second passenger restraint 484). This may avoid the use of external assistance mechanisms, such as the previously described assistance mechanism 490, 494.

Figure 5:
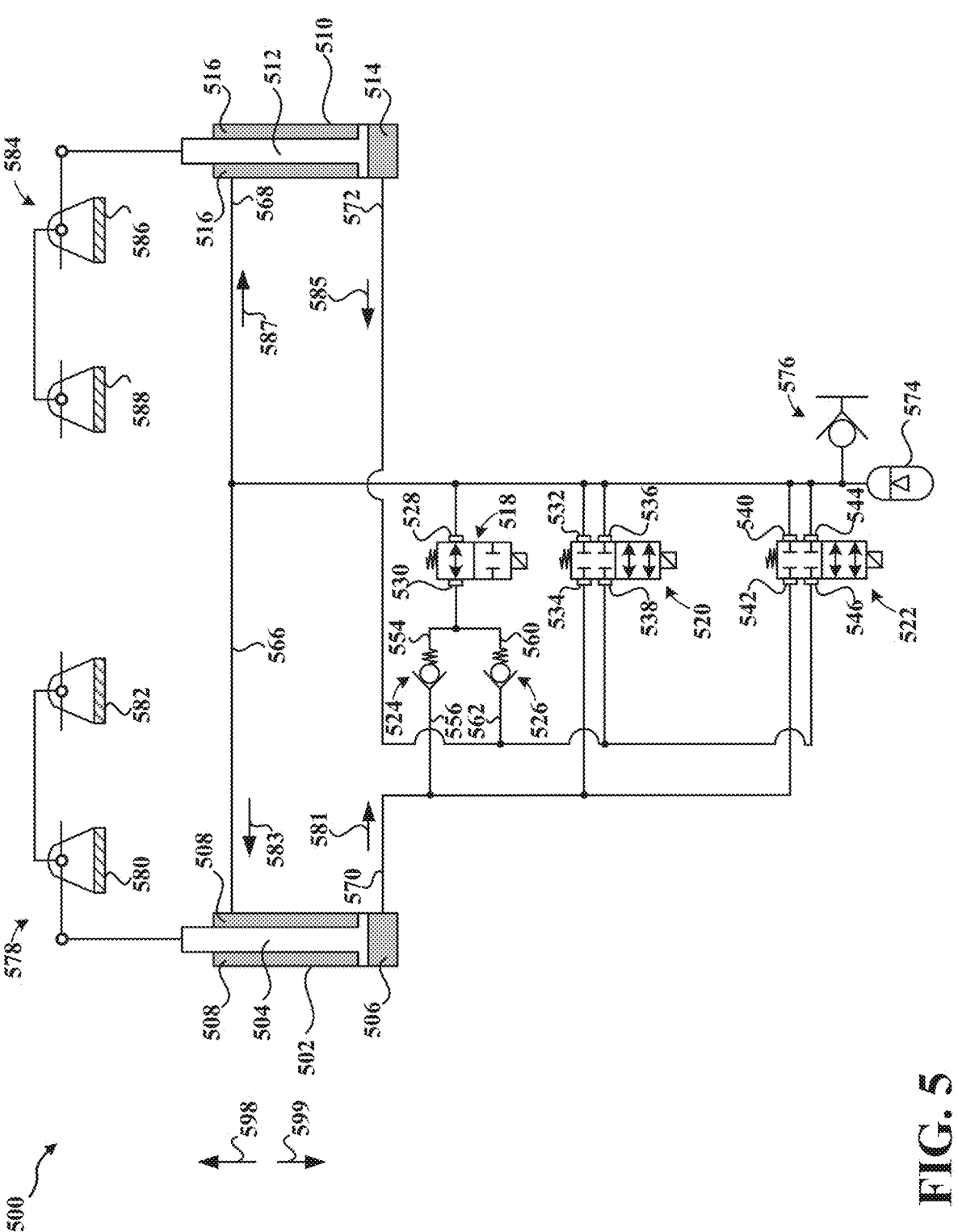
FIG. 5 illustrates operation of a passenger restraint apparatus in accordance with various aspects of the disclosure.

FIG. 5 illustrates a passenger restraint apparatus 500 in accordance with various aspects. The passenger restraint apparatus 500 includes a first fluid powered actuator 502, a second fluid powered actuator 510, a first one-way valve 524, a second one-way valve 526, a third one-way valve 576, a first switchable valve 518, a second switchable valve 520, a third switchable valve 522, a fluid accumulator 574, a first passenger restraint 578, and a second passenger restraint 584.

The first fluid powered actuator 502 includes a movable element 504, a first fluid chamber 506 and a second fluid chamber 508. The movable element 504 is configured to move in a first direction (e.g., in a direction of arrow 598) when a fluid flows into the first fluid chamber 506 or in a second direction (e.g., in a direction of arrow 599) when the fluid flows into the second fluid chamber 508.

The second fluid powered actuator 510 includes a movable element 512, a first fluid chamber 514 and a second fluid chamber 516. The movable element 512 is configured to move in a third direction (e.g., in a direction of arrow 598) when the fluid flows into the first fluid chamber 514 or in a fourth direction (e.g., in a direction of arrow 599) when the fluid flows into the second fluid chamber 516.

The first switchable valve 518 may be implemented as a two-way valve, such as the two-way valve 100 described with reference to FIGS. 1A through 1C. The first switchable valve 518 includes multiple ports, such as a first port 528 and a second port 530. The first port 528 is coupled to the second fluid chamber 508 of the first fluid powered actuator 502 and the second fluid chamber 516 of the second fluid powered actuator 510. The second port 530 is coupled to the first fluid chamber 506 of the first fluid powered actuator 502 via the first one-way valve 524. The second port 530 is further coupled to the first fluid chamber 514 of the second fluid powered actuator 510 via the second one-way valve 526.

The second switchable valve 520 may be implemented as a four-way valve, such as the four-way valve 200 described with reference to FIGS. 2A through 2C. The second switchable valve 520 includes multiple ports, such as a first port 532, a second port 534, a third port, 536, and a fourth port 538. The first port 532 and the third port 536 are both coupled to the second fluid chamber 508 of the first fluid powered actuator 502 and the second fluid chamber 516 of the second fluid powered actuator 510. The second port 534 is coupled to the first fluid chamber 506 of the first fluid powered actuator 502. The fourth port 538 is coupled to the first fluid chamber 514 of the second fluid powered actuator 510.

The third switchable valve 522 may be implemented as a four-way valve, such as the four-way valve 200 described with reference to FIGS. 2A through 2C. The second switchable valve 522 includes multiple ports, such as a first port 540, a second port 542, a third port, 544, and a fourth port 546. The first port 540 and the third port 544 are both coupled to the second fluid chamber 508 of the first fluid powered actuator 502 and the second fluid chamber 516 of the second fluid powered actuator 510. The second port 542 is coupled to the first fluid chamber 506 of the first fluid powered actuator 502. The fourth port 546 is coupled to the first fluid chamber 514 of the second fluid powered actuator 510.

The second fluid chamber 508 of the first fluid powered actuator 502 and the second fluid chamber 516 of the second fluid powered actuator 510 are coupled to the fluid accumulator 574 and the third one-way valve 576. The fluid accumulator 574 may be a device for storing a fluid under pressure and releasing the fluid as needed with a proper (e.g., consistent) flow. The third one-way valve 576 may serve as a test port to enable an operator to fill fluid (e.g., a hydraulic fluid), monitor, measure, and/or test a pressure or a condition of the fluid.

When the first switchable valve 518 is in an ON state (e.g., fluid is enabled to flow between the first and second ports 528, 530), the first one-way valve 524 may enable movement of the movable element 504 in the second direction (e.g., in a direction of arrow 599) and may prevent movement of the movable element 504 in the first direction (e.g., in a direction of arrow 598). For example, when the movable element 504 is moved in the second direction (e.g., in a direction of arrow 599), fluid may flow out of the first chamber 506 of the first fluid powered actuator 502 through a fluid path 570 (as indicated with arrow 581) and may flow into the second fluid chamber 508 of the first fluid powered actuator 502 through a fluid path 566 (as indicated with arrow 583). In this scenario, the first one-way valve 524 will enable fluid flow from an inlet fluid path 556 to an outlet fluid path 554.

It should be noted that the movable element 504 cannot be moved in the first direction (e.g., in a direction of arrow 598) when the first switchable valve 518 is in an ON state and the second switchable valve 520 and the third switchable valve 522 are in an OFF state. For example, since the first one-way valve 524 will not allow fluid flow from the outlet fluid path 554 to the inlet fluid path 556, the first one-way valve 524 prevents fluid flow into the first fluid chamber 506, and consequently, out of the second fluid chamber 508 of the first fluid powered actuator 502. The movable element 504 cannot be moved in the first direction (e.g., in a direction of arrow 598) if fluid cannot flow out of the second fluid chamber 508 of the first fluid powered actuator 502.

The movable element 504 may be moved in the second direction (e.g., in a direction of arrow 599) until full retraction of the movable element 504 is achieved. The movable element 504 may be moved in the second direction (e.g., in a direction of arrow 599) independently of the movable element 512 of the second fluid powered actuator 510.

When the first switchable valve 518 is in an ON state (e.g., fluid is enabled to flow between the first and second ports 528, 530), the second one-way valve 526 may enable movement of the movable element 512 of the second fluid powered actuator 510 in the fourth direction (e.g., in a direction of arrow 599) and may prevent movement of the movable element 512 in the third direction (e.g., in a direction of arrow 598). For example, when the movable element 512 is moved in the fourth direction (e.g., in a direction of arrow 599), fluid may flow out of the first fluid chamber 514 of the second fluid powered actuator 510 through a fluid path 572 (as indicated with arrow 585) and may flow into the second fluid chamber 516 of the second fluid powered actuator 510 through a fluid path 568 (as indicated with arrow 587). In this scenario, the second one-way valve 526 will enable fluid flow from an inlet fluid path 562 to an outlet fluid path 560.

It should be noted that the movable element 512 cannot be moved in the third direction (e.g., in a direction of arrow 598) when the first switchable valve 518 is in an ON state and the second switchable valve 520 and the third switchable valve 522 are in an OFF state. For example, since the second one-way valve 526 will not allow fluid flow from the outlet fluid path 560 to the inlet fluid path 562, the second one-way valve 526 prevents fluid flow into the first fluid chamber 514, and consequently, out of the second fluid chamber 516 of the second fluid powered actuator 510. The movable element 512 cannot be moved in the third direction (e.g., in a direction of arrow 598) if fluid cannot flow out of the second fluid chamber 516 of the second fluid powered actuator 510.

The movable element 512 may be moved in the fourth direction (e.g., in a direction of arrow 599) until full retraction of the movable element 512 is achieved. The movable element 512 may be moved in the fourth direction (e.g., in a direction of arrow 599) independently of the movable element 504 of the first fluid powered actuator 502.

In some implementations, the first passenger restraint 578 may include one or more lap bars for a first row in a ride vehicle, such as a first lap bar 580 and/or a second lap bar 582. The second passenger restraint 584 may include one or more lap bars for a second row in the ride vehicle, such as a first lap bar 586 and/or a second lap bar 588. In some examples, the first passenger restraint 578 is engaged when the movable element 504 is moved in the second direction (e.g., in a direction of arrow 599) until passengers are secured or until full retraction of the movable element 504 is achieved. In some examples, the second passenger restraint 584 is engaged when the movable element 512 is moved in the fourth direction (e.g., in a direction of arrow 599) until passengers are secured or until full retraction of the movable element 512 is achieved.

During operation of the passenger restraint apparatus 500 when the first switchable valve 518 is in the ON state, since the movable element 504 of the first fluid powered actuator 502 is enabled to move in the second direction (e.g., in a direction of arrow 599) to engage the first passenger restraint 578 and cannot be moved in the first direction (e.g., in a direction of arrow 598) to disengage the first passenger restraint 578, passengers in a first row of a ride vehicle may not inadvertently or intentionally disengage the first passenger restraint 578. Similarly, since the movable element 512 of the second fluid powered actuator 510 is enabled to move in the third direction (e.g., in a direction of arrow 599) to engage the second passenger restraint 584 and cannot be moved in the fourth direction (e.g., in a direction of arrow 598) to disengage the second passenger restraint 584, passengers of a second row of the ride vehicle may not inadvertently or intentionally disengage the second passenger restraint 584. In some examples, the first switchable valve 518 may remain in the ON state when the ride vehicle is in operation, which may enable passengers to further engage the first and/or second passenger restraints 578, 584 (e.g., move the lap bars 580, 582, 586, 588 closer to the passenger(s)) during operation of the ride vehicle.

When the second switchable valve 520 is in an ON state (e.g., where the first port 532 is connected to the second port 534 to enable fluid flow between the first and second ports 532, 534, and where the third port 536 is connected to the fourth port 538 to enable fluid flow between the third and fourth ports 536, 538), the first and second movable elements 504, 512 may be independently moved. For example, the movable element 504 may be moved in the first direction (e.g., in a direction of arrow 598) or the second direction (e.g., in a direction of arrow 599), and the movable element 512 may be moved in the third direction (e.g., in a direction of arrow 598) or in the fourth direction (e.g., in a direction of arrow 599).

When the second switchable valve 520 is in an ON state, the first and second one-way valves 524, 526 are bypassed via the second switchable valve 520. This enables fluid to freely flow between the first and second fluid chambers 506, 508 of the first fluid powered actuator 502, and enables fluid to freely flow between the first and second fluid chambers 514, 516 of the second fluid powered actuator 510.

It should be noted that when the second switchable valve 520 is in the ON state, the movable elements 504, 512 may be independently moved despite the state of the first switchable valve 518. Therefore, in some examples, the second switchable valve 520 may be used to enable disengagement of the first and second passenger restraints 578, 584. For example, a control system of a ride vehicle may set the second switchable valve 520 to the ON state when passengers are ready to exit the ride vehicle.

When the third switchable valve 522 is in an ON state (e.g., where the first port 540 is connected to the second ports 542 to enable fluid flow between the first and second ports 540, 542, and where the third port 544 is connected to the fourth port 546 to enable fluid flow between the third and fourth ports 544, 546), the first and second movable elements 504, 512 may be independently moved. For example, the movable element 504 may be moved in the first direction (e.g., in a direction of arrow 598) or the second direction (e.g., in a direction of arrow 599), and the movable element 512 may be moved in the third direction (e.g., in a direction of arrow 598) or in the fourth direction (e.g., in a direction of arrow 599).

When the third switchable valve 522 is in an ON state, the first and second one-way valves 524, 526 are bypassed via the third switchable valve 522. This enables fluid to freely flow between the first and second fluid chambers 506, 508 of the first fluid powered actuator 502, and enables fluid to freely flow between the first and second fluid chambers 514, 516 of the second fluid powered actuator 510.

When the first switchable valve 518 is in an OFF state (e.g., fluid is not allowed to flow between the first and second ports 528, 530) and the second and third switchable valves 520, 522 are also in the OFF state, fluid cannot flow between the first and second fluid chambers 506, 508 of the first fluid powered actuator 502, and fluid cannot flow between the first and second fluid chambers 514, 516 of the second fluid powered actuator 510. Therefore, the movable elements 504, 512 and the first and second passenger restraints 578, 584 may not move. In some implementations, the first switchable valve 518 may be maintained in the OFF state to lock the movable elements 504, 512 and the first and second passenger restraints 578, 584 in their current positions.

In some scenarios, the first switchable valve 518 may be maintained in the OFF state when the first and second passenger restraints 578, 584 are disengaged (e.g., when the first and second movable elements 504, 512 are fully or partially extended) to facilitate loading and/or unloading of passengers from the ride vehicle. This may prevent inadvertent or intentional engagement of the first and second passenger restraints 578, 584 during loading and/or unloading of passengers from the ride vehicle.

It should be noted that when the third switchable valve 522 is in the ON state, the movable elements 504, 512 may be independently moved despite the states of the first and second switchable valves 518, 520. Therefore, in some examples, the third switchable valve 522 may be used as an override (e.g., in an emergency situation) to enable disengagement of the first and second passenger restraints 578, 584. For example, an operator may be enabled to set the third switchable valve 522 to the ON state to manually release the first and second passenger restraints 578, 584 in scenarios where passengers need to evacuate the ride vehicle.

Figure 6:
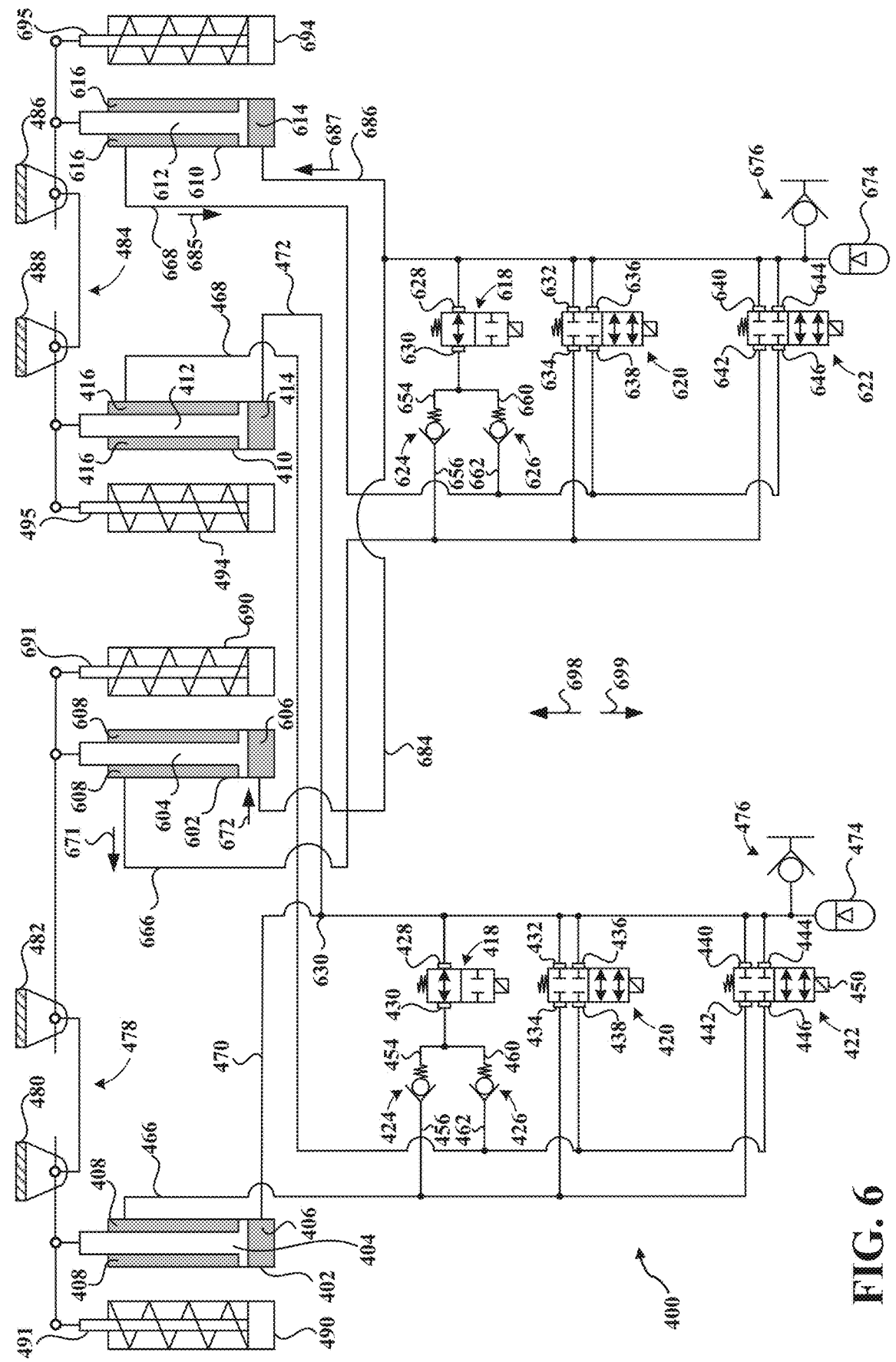
FIG. 6 illustrates the apparatus of FIGS. 4A through 4J in a redundant system configuration.

FIG. 6 illustrates the passenger restraint apparatus 400 previously described with reference to FIGS. 4A through 4J in a redundant system configuration. FIG. 6 includes a first supplemental fluid powered actuator 602, a second supplemental fluid powered actuator 610, a first supplemental one-way valve 624, a second supplemental one-way valve 626, a third supplemental one-way valve 676, a first supplemental switchable valve 618, a second supplemental switchable valve 620, a third supplemental switchable valve 622, and a supplemental fluid accumulator 674.

The first supplemental fluid powered actuator 602 includes a movable element 604, a first fluid chamber 606 and a second fluid chamber 608. The movable element 604 is configured to move in a first direction (e.g., in a direction of arrow 698) when a fluid flows into the first fluid chamber 606 or in a second direction (e.g., in a direction of arrow 699) when the fluid flows into the second fluid chamber 608.

The second supplemental fluid powered actuator 610 includes a movable element 612, a first fluid chamber 614 and a second fluid chamber 616. The movable element 612 is configured to move in a third direction (e.g., in a direction of arrow 698) when the fluid flows into the first fluid chamber 614 or in a fourth direction (e.g., in a direction of arrow 699) when the fluid flows into the second fluid chamber 616.

The first supplemental switchable valve 618 may be implemented as a two-way valve, such as the two-way valve 100 described with reference to FIGS. 1A through IC. The first supplemental switchable valve 618 includes multiple ports, such as a first port 628 and a second port 630. The first port 628 is coupled to the first fluid chamber 606 of the first supplemental fluid powered actuator 602 and the first fluid chamber 614 of the second supplemental fluid powered actuator 610. The second port 630 is coupled to the second fluid chamber 608 of the first supplemental fluid powered actuator 602 via the first supplemental one-way valve 624. The second port 630 is further coupled to the second fluid chamber 616 of the second supplemental fluid powered actuator 610 via the second supplemental one-way valve 626.

The second supplemental switchable valve 620 may be implemented as a four-way valve, such as the four-way valve 200 described with reference to FIGS. 2A through 2C. The second supplemental switchable valve 620 includes multiple ports, such as a first port 632, a second port 634, a third port, 636, and a fourth port 638. The first port 632 and the third port 636 are both coupled to the first fluid chamber 606 of the first supplemental fluid powered actuator 602 and the first fluid chamber 614 of the second supplemental fluid powered actuator 610. The second port 634 is coupled to the second fluid chamber 608 of the first supplemental fluid powered actuator 602. The fourth port 638 is coupled to the second fluid chamber 616 of the second supplemental fluid powered actuator 610.

The third supplemental switchable valve 622 may be implemented as a four-way valve, such as the four-way valve 200 described with reference to FIGS. 2A through 2C. The third supplemental switchable valve 622 includes multiple ports, such as a first port 640, a second port 642, a third port, 644, and a fourth port 646. The first port 640 and the third port 644 are both coupled to the first fluid chamber 606 of the first supplemental fluid powered actuator 602 and the first fluid chamber 614 of the second supplemental fluid powered actuator 610. The second port 642 is coupled to the second fluid chamber 608 of the first supplemental fluid powered actuator 602. The fourth port 646 is coupled to the second fluid chamber 616 of the second supplemental fluid powered actuator 610.

The first fluid chamber 606 of the first supplemental fluid powered actuator 602 and the first fluid chamber 614 of the second supplemental fluid powered actuator 610 are coupled to the supplemental fluid accumulator 674 and the third supplemental one-way valve 676. The supplemental fluid accumulator 674 may be a device for storing a fluid under pressure and releasing the fluid as needed with a proper (e.g., consistent) flow. The third supplemental one-way valve 676 may serve as a test port to enable an operator to monitor, measure, and/or test a pressure or a condition of the fluid.

When the first supplemental switchable valve 618 is in an ON state (e.g., fluid is enabled to flow between the first and second ports 628, 630), the first supplemental one-way valve 624 may enable movement of the movable element 604 in the first direction (e.g., in a direction of arrow 698) and may prevent movement of the movable element 604 in the second direction (e.g., in a direction of arrow 699). For example, when the movable element 604 is moved in the first direction (e.g., in a direction of arrow 698), fluid may flow out of the second fluid chamber 608 of the first supplemental fluid powered actuator 602 through a fluid path 666 (as indicated with arrow 671) and may flow into the first fluid chamber 606 of the first supplemental fluid powered actuator 602 through a fluid path 684 (as indicated with arrow 672). In this scenario, the first supplemental one-way valve 624 will enable fluid flow from an inlet fluid path 656 to an outlet fluid path 654.

It should be noted that the movable element 604 cannot be moved in the second direction (e.g., in a direction of arrow 699) when the first supplemental switchable valve 618 is in an ON state and the second supplemental switchable valve 620 and the third supplemental switchable valve 622 are in an OFF state. For example, since the first supplemental one-way valve 624 will not allow fluid flow from the outlet fluid path 654 to the inlet fluid path 656, the first supplemental one-way valve 624 prevents fluid flow into the second fluid chamber 608, and consequently, out of the first fluid chamber 606 of the first supplemental fluid powered actuator 602. The movable element 604 cannot be moved in the second direction (e.g., in a direction of arrow 699) if fluid cannot flow out of the first fluid chamber 606 of the first supplemental fluid powered actuator 602.

It should be noted that the movable element 604 of the first supplemental fluid powered actuator 602 is mechanically linked to the movable element 404 of the first fluid powered actuator 402, such that the movable element 404 and the movable element 604 move together in the same direction. Moreover, the movable element 612 of the second supplemental fluid powered actuator 610 is mechanically linked to the movable element 412 of the second fluid powered actuator 410, such that the movable element 412 and the movable element 612 move together in the same direction. The movable elements 404, 604 may be moved in the first direction (e.g., in a direction of arrow 698) until full extension of the movable elements 404, 604 is achieved. The movable elements 404, 604 may be moved in the first direction (e.g., in a direction of arrow 698) independently of the movable elements 412, 612.

When the first supplemental switchable valve 618 is in an ON state (e.g., fluid is enabled to flow between the first and second ports 628, 630), the second supplemental one-way valve 626 may enable movement of the movable element 612 of the second supplemental fluid powered actuator 610 in the third direction (e.g., in a direction of arrow 698) and may prevent movement of the movable element 612 in the fourth direction (e.g., in a direction of arrow 699). For example, when the movable element 612 is moved in the third direction (e.g., in a direction of arrow 698), fluid may flow out of the second fluid chamber 616 of the second supplemental fluid powered actuator 610 through a fluid path 668 (as indicated with arrow 685) and may flow into the first fluid chamber 614 of the second supplemental fluid powered actuator 610 through a fluid path 686 (as indicated with arrow 687). In this scenario, the second supplemental one-way valve 626 will enable fluid flow from an inlet fluid path 662 to an outlet fluid path 660.

It should be noted that the movable element 612 cannot be moved in the fourth direction (e.g., in a direction of arrow 699) when the first supplemental switchable valve 618 is in an ON state and the second supplemental switchable valve 620 and the third supplemental switchable valve 622 are in an OFF state. For example, since the second supplemental one-way valve 626 will not allow fluid flow from the outlet fluid path 660 to the inlet fluid path 662, the second supplemental one-way valve 626 prevents fluid flow into the second fluid chamber 616, and consequently, out of the first fluid chamber 614 of the second supplemental fluid powered actuator 610. The movable element 612 cannot be moved in the fourth direction (e.g., in a direction of arrow 699) if fluid cannot flow out of the first fluid chamber 614 of the second supplemental fluid powered actuator 610.

As stated above, the movable element 612 of the second supplemental fluid powered actuator 610 is mechanically linked to the movable element 412 of the second fluid powered actuator 410, such that the movable element 412 and the movable element 612 move together in the same direction. The movable elements 412, 612 may be moved in the first direction (e.g., in a direction of arrow 698) until full extension of the movable elements 412, 612 is achieved. The movable elements 412, 612 may be moved in the first direction (e.g., in a direction of arrow 698) independently of the movable elements 404, 604.

During operation of the passenger restraint apparatus 400 when the first switchable valve 418 and the first supplemental switchable valve 618 are in the ON state, since the movable element 404 of the first fluid powered actuator 402 and the movable element 604 of the first supplemental fluid powered actuator 602 are enabled to move in the first direction (e.g., in a direction of arrow 698) to engage the first passenger restraint 478 and cannot be moved in the second direction (e.g., in a direction of arrow 699) to disengage the first passenger restraint 478, passengers in a first row of a ride vehicle may not inadvertently or intentionally disengage the first passenger restraint 478. Similarly, since the movable element 412 of the second fluid powered actuator 410 and the movable element 612 of the second supplemental fluid powered actuator 610 are enabled to move in the third direction (e.g., in a direction of arrow 698) to engage the second passenger restraint 484 and cannot be moved in the fourth direction (e.g., in a direction of arrow 699) to disengage the second passenger restraint 484, passengers of a second row of the ride vehicle may not inadvertently or intentionally disengage the second passenger restraint 484. In some examples, the first switchable valve 418 and the first supplemental switchable valve 618 may remain in the ON state when the ride vehicle is in operation, which may enable passengers to further engage the first and/or second passenger restraints 478, 484 (e.g., move the lap bars 480, 482, 486, 488 closer to the passenger(s)) during operation of the ride vehicle.

When the second switchable valve 420 and the second supplemental switchable valve 620 are in an ON state (e.g., when fluid may flow between the first and second ports 432, 434 and between the third and fourth ports 436, 438 of the second switchable valve 420, and when fluid may flow between the first and second ports 632, 634 and between the third and fourth ports 636, 638 of the second supplemental switchable valve 620), the movable elements 404, 604 may together move independently of the movable elements 412, 612. For example, the movable elements 404, 604 may together be moved in the first direction (e.g., in a direction of arrow 698) or the second direction (e.g., in a direction of arrow 699) independent of the linked movement of the movable elements 412, 612 that may be moved in the third direction (e.g., in a direction of arrow 698) or in the fourth direction (e.g., in a direction of arrow 699).

When the third switchable valve 422 and the third supplemental switchable valve 622 are in an ON state (e.g., when fluid may flow between the first and second ports 440, 442 and between the third and fourth ports 444, 446 of the third switchable valve 422, and when fluid may flow between the first and second ports 640, 642 and between the third and fourth ports 644, 646 of the third supplemental switchable valve 622), the movable elements 404, 604 may together move independently of the movable elements 412, 612. For example, the movable elements 404, 604 may together be moved in the first direction (e.g., in a direction of arrow 698) or the second direction (e.g., in a direction of arrow 699) independent of the linked movement of the movable elements 412, 612 that may be moved in the third direction (e.g., in a direction of arrow 698) or in the fourth direction (e.g., in a direction of arrow 699).

When the first switchable valve 418 and the first supplemental switchable valve 618 are in an OFF state (e.g., fluid is not allowed to flow between the first and second ports 428, 430 and fluid is not allowed to flow between the first and second ports 628, 630), the second and third switchable valves 420, 422 are in the OFF state, and the second and third supplemental switchable valves 620, 622 are in the OFF state, the movable elements 404, 412, 604, 612 and the first and second passenger restraints 478, 484 may not move. In some implementations, the first switchable valve 418 and the first supplemental switchable valve 618 may be maintained in the OFF state to lock the movable elements 404, 412, 604, 612 and the first and second passenger restraints 478, 484 in their current positions.

In some scenarios, the first switchable valve 418 and the first supplemental switchable valve 618 may be maintained in the OFF state when the first and second passenger restraints 478, 484 are disengaged (e.g., when the movable elements 404, 412, 604, 612 are fully or partially retracted) to facilitate loading and/or unloading of passengers from the ride vehicle. This may prevent inadvertent or intentional engagement of the first and second passenger restraints 478, 484 during loading and/or unloading of passengers from the ride vehicle.

In some aspects, an assistance mechanism may be coupled to the first and/or second supplemental fluid powered actuator 602, 610. For example, a first assistance mechanism 690 may be coupled to the first supplemental fluid powered actuator 602 and a second assistance mechanism 694 may be coupled to the second supplemental fluid powered actuator 610. In one nonlimiting example, the assistance mechanisms 690, 694 may include a coil spring mechanism or a gas spring mechanism (also referred to as a gas strut) as previously described with reference to the assistance mechanisms 490, 494. For example, rod 691 of the first assistance mechanism 690 and rod 695 of the second assistance mechanism 694 may be configured to extend in the first direction (e.g., in a direction of arrow 698) and retract in the second direction (e.g., in a direction of arrow 699).

Figure 7:
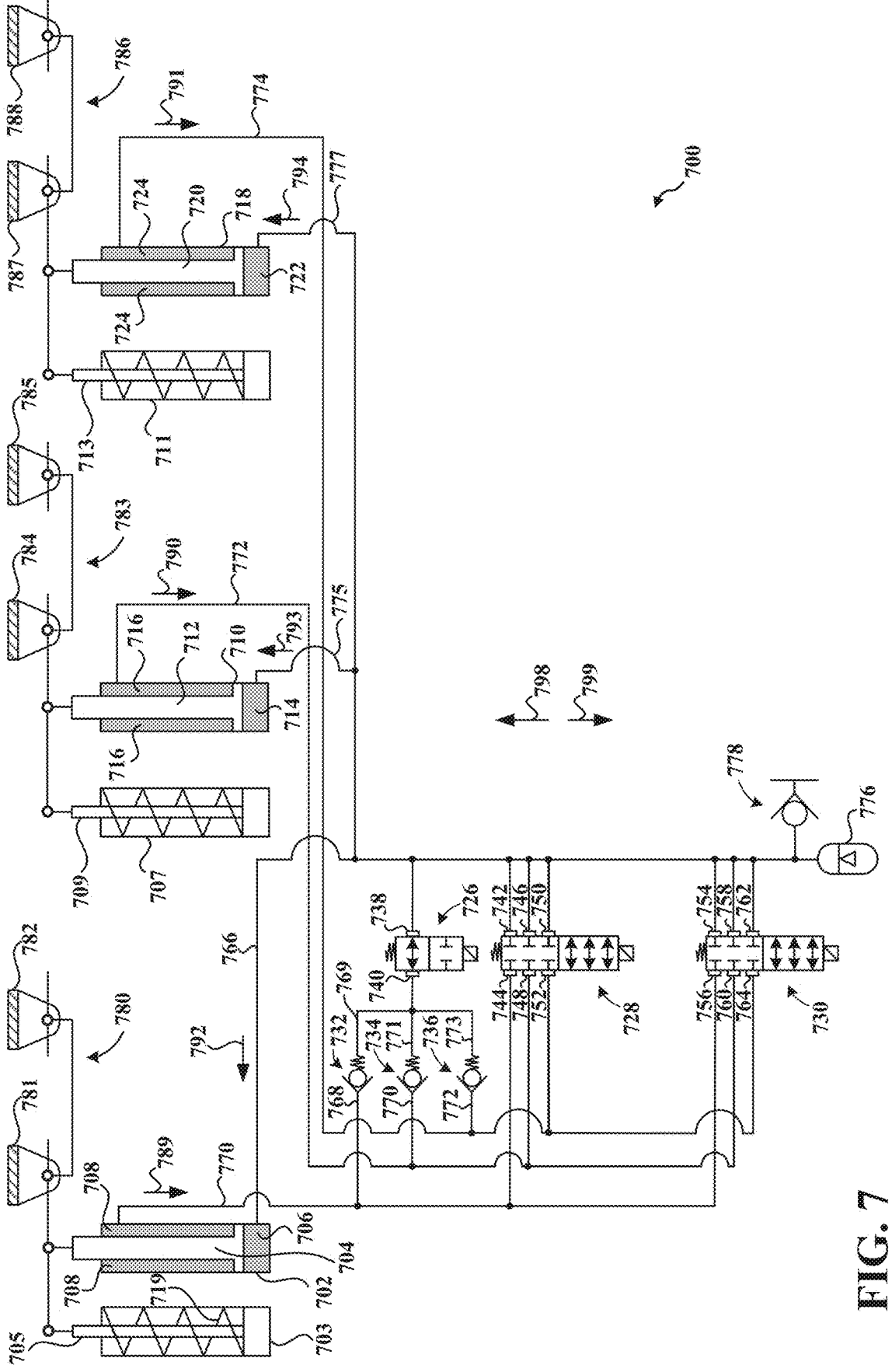
FIG. 7 illustrates operation of a passenger restraint apparatus in accordance with various aspects of the disclosure.

FIG. 7 illustrates operation of an apparatus 700 in accordance with various aspects of the present disclosure. With reference to FIG. 7, the apparatus 700 includes a first fluid powered actuator 702, a second fluid powered actuator 710, a third fluid powered actuator 718, a first one-way valve 732, a second one-way valve 734, a third one-way valve 736, a fourth one-way valve 778, a first switchable valve 726, a second switchable valve 728, a third switchable valve 730, a fluid accumulator 776, a first passenger restraint 780, a second passenger restraint 783, and a third passenger restraint 786.

The first fluid powered actuator 702 includes a movable element 704, a first fluid chamber 706 and a second fluid chamber 708. The movable element 704 is configured to move in a first direction (e.g., in a direction of arrow 798) when a fluid flows into the first fluid chamber 706 or in a second direction (e.g., in a direction of arrow 799) when the fluid flows into the second fluid chamber 708.

The second fluid powered actuator 710 includes a movable element 712, a first fluid chamber 714 and a second fluid chamber 716. The movable element 712 is configured to move in a third direction (e.g., in a direction of arrow 798) when the fluid flows into the first fluid chamber 714 or in a fourth direction (e.g., in a direction of arrow 799) when the fluid flows into the second fluid chamber 716.

The third fluid powered actuator 718 includes a movable element 720, a first fluid chamber 722 and a second fluid chamber 724. The movable element 720 is configured to move in a fifth direction (e.g., in a direction of arrow 798) when the fluid flows into the first fluid chamber 722 or in a sixth direction (e.g., in a direction of arrow 799) when the fluid flows into the second fluid chamber 724.

The first switchable valve 726 may be implemented as a two-way valve, such as the two-way valve 100 described with reference to FIGS. 1A through IC. The first switchable valve 726 includes multiple ports, such as a first port 738 and a second port 740. The first port 738 is coupled to the first fluid chamber 706 of the first fluid powered actuator 702, the first fluid chamber 714 of the second fluid powered actuator 710, and the first fluid chamber 722 of the third fluid powered actuator 718. The second port 740 is coupled to the second fluid chamber 708 of the first fluid powered actuator 702 via the first one-way valve 732. The second port 740 is further coupled to the second fluid chamber 716 of the second fluid powered actuator 710 via the second one-way valve 734. The second port 740 is further coupled to the second fluid chamber 724 of the third fluid powered actuator 718 via the third one-way valve 736.

The second switchable valve 728 may be implemented as a six-way valve. The second switchable valve 728 includes multiple ports, such as a first port 742, a second port 744, a third port 746, a fourth port 748, a fifth port 750, and a sixth port 752. The first port 742, the third port 746, and the fifth port 750 are all coupled to the first fluid chamber 706 of the first fluid powered actuator 702, the first fluid chamber 714 of the second fluid powered actuator 710, and the first fluid chamber 722 of the third fluid powered actuator 718. The second port 744 is coupled to the second fluid chamber 708 of the first fluid powered actuator 702. The fourth port 748 is coupled to the second fluid chamber 716 of the second fluid powered actuator 710. The sixth port 752 is coupled to the second fluid chamber 724 of the third fluid powered actuator 718. As shown and described, the second switchable valve 728 is implemented as a six-way valve to accommodate the presence of three fluid powered actuators (e.g., first, second, and third fluid powered actuators 702, 710, and 718) in the apparatus 700. However, it is contemplated that the second switchable valve 728 may be implemented as any type of valve suitable to accommodate the number of fluid powered actuators present in the apparatus 700. For example, the second switchable valve 728 may be implemented as an eight-way valve to accommodate the presence of four fluid powered actuators, as a ten-way valve to accommodate the presence of five fluid powered actuators, etc.

The third switchable valve 730 may be implemented as a six-way valve. The third switchable valve 730 includes multiple ports, such as a first port 754, a second port 756, a third port 758, a fourth port 760, a fifth port 762, and a sixth port 764. The first port 754, the third port 758, and the fifth port 762 are all coupled to the first fluid chamber 706 of the first fluid powered actuator 702, the first fluid chamber 714 of the second fluid powered actuator 710, and the first fluid chamber 722 of the third fluid powered actuator 718. The second port 756 is coupled to the second fluid chamber 708 of the first fluid powered actuator 702. The fourth port 760 is coupled to the second fluid chamber 716 of the second fluid powered actuator 710. The sixth port 764 is coupled to the second fluid chamber 724 of the third fluid powered actuator 718. As shown and described, the third switchable valve 730 is implemented as a six-way valve to accommodate the presence of three fluid powered actuators (e.g., first, second, and third fluid powered actuators 702, 710, and 718) in the apparatus 700. However, it is contemplated that the third switchable valve 730 may be implemented as any type of valve suitable to accommodate the number of fluid powered actuators present in the apparatus 700. For example, the third switchable valve 730 may be implemented as an eight-way valve to accommodate the presence of four fluid powered actuators, as a ten-way valve to accommodate the presence of five fluid powered actuators, etc.

The first fluid chamber 706 of the first fluid powered actuator 702, the first fluid chamber 714 of the second fluid powered actuator 710, and the first fluid chamber 722 of the third fluid powered actuator 718 are coupled to the fluid accumulator 776 and the fourth one-way valve 778. The fluid accumulator 776 may be a device for storing a fluid under pressure and releasing the fluid as needed with a proper (e.g., consistent) flow. The fourth one-way valve 778 may serve as a test port to enable an operator to monitor, measure, and/or test a pressure or a condition of the fluid.

When the first switchable valve 726 is in an ON state (e.g., fluid is enabled to flow between the first and second ports 738, 740), the first one-way valve 732 may enable movement of the movable element 704 in the first direction (e.g., in a direction of arrow 798) and may prevent movement of the movable element 704 in the second direction (e.g., in a direction of arrow 799). For example, when the movable element 704 is moved in the first direction (e.g., in a direction of arrow 798), fluid may flow out of the second fluid chamber 708 of the first fluid powered actuator 702 through a fluid path 770 (as indicated with arrow 789) and may flow into the first fluid chamber 706 of the first fluid powered actuator 702 through a fluid path 766 (as indicated with arrow 792). In this scenario, the first one-way valve 732 will enable fluid flow from an inlet fluid path 768 to an outlet fluid path 769.

When the first switchable valve 726 is in an ON state (e.g., fluid is enabled to flow between the first and second ports 738, 740), the second one-way valve 734 may enable movement of the movable element 712 in the third direction (e.g., in a direction of arrow 798) and may prevent movement of the movable element 712 in the fourth direction (e.g., in a direction of arrow 799). For example, when the movable element 712 is moved in the third direction (e.g., in a direction of arrow 798), fluid may flow out of the second fluid chamber 716 of the second fluid powered actuator 710 through a fluid path 772 (as indicated with arrow 790) and may flow into the first fluid chamber 714 of the second fluid powered actuator 710 through a fluid path 775 (as indicated with arrow 793). In this scenario, the second one-way valve 734 will enable fluid flow from an inlet fluid path 770 to an outlet fluid path 771.

When the first switchable valve 726 is in an ON state (e.g., fluid is enabled to flow between the first and second ports 738, 740), the third one-way valve 736 may enable movement of the movable element 720 in the fifth direction (e.g., in a direction of arrow 798) and may prevent movement of the movable element 720 in the sixth direction (e.g., in a direction of arrow 799). For example, when the movable element 720 is moved in the fifth direction (e.g., in a direction of arrow 798), fluid may flow out of the second fluid chamber 724 of the third fluid powered actuator 718 through a fluid path 774 (as indicated with arrow 791) and may flow into the first fluid chamber 722 of the third fluid powered actuator 718 through a fluid path 777 (as indicated with arrow 794). In this scenario, the third one-way valve 736 will enable fluid flow from an inlet fluid path 772 to an outlet fluid path 773.

It should be noted that none of the movable elements 704, 712, 720 can be respectively moved in the second, fourth, and sixth directions (e.g., in a direction of arrow 799) when the first switchable valve 726 is in an ON state and the second switchable valve 728 and the third switchable valve 730 are in an OFF state. For example, since the first one-way valve 732 will not allow fluid flow from the outlet fluid path 769 to the inlet fluid path 768, the first one-way valve 732 prevents fluid flow out of the first fluid chamber 706 of the first fluid powered actuator 702. The movable element 704 cannot be moved in the second direction (e.g., in a direction of arrow 799) if fluid cannot flow out of the first fluid chamber 706 of the first fluid powered actuator 702. The same principles prevent movement of the movable element 712 in the fourth direction (e.g., in a direction of arrow 799) and the movable element 720 in sixth direction (e.g., in a direction of arrow 799) when the first switchable valve 726 is in an ON state and the second switchable valve 728 and the third switchable valve 730 are in an OFF state.

In some examples, the movable elements 704, 712, 720 may be respectively moved in the first, third, and fifth directions (e.g., in a direction of arrow 798) until full extension of the movable elements 704, 712, 720 is achieved. The movable elements 704, 712, 720 may be moved in the first direction (e.g., in a direction of arrow 798) independently of one another.

In some implementations, the first passenger restraint 780 may include one or more lap bars for a first row in a ride vehicle, such as a first lap bar 781 and/or a second lap bar 782. The second passenger restraint 783 may include one or more lap bars for a second row in the ride vehicle, such as a first lap bar 784 and/or a second lap bar 785. The third passenger restraint 786 may include one or more lap bars for a third row in the ride vehicle, such as a first lap bar 787 and/or a second lap bar 788. In some examples, the first passenger restraint 780 is engaged when the movable element 704 is moved in the first direction (e.g., in a direction of arrow 798) until passengers are secured or until full extension of the movable element 704 is achieved. In some examples, the second passenger restraint 783 is engaged when the movable element 712 is moved in the third direction (e.g., in a direction of arrow 798) until passengers are secured or until full extension of the movable element 712 is achieved. In some examples, the third passenger restraint 786 is engaged when the movable element 720 is moved in the fifth direction (e.g., in a direction of arrow 798) until passengers are secured or until full extension of the movable element 720 is achieved.

During operation of the apparatus 700 when the first switchable valve 726 is in the ON state, since the movable element 704 of the first fluid powered actuator 702 is enabled to move in the first direction (e.g., in a direction of arrow 798) to engage the first passenger restraint 780 and cannot be moved in the second direction (e.g., in a direction of arrow 799) to disengage the first passenger restraint 780, passengers in a first row of a ride vehicle may not inadvertently or intentionally disengage the first passenger restraint 780. Similarly, since the movable elements 712, 720 of the second and third fluid powered actuators 710, 718 are enabled to move in the third direction or fifth direction (e.g., in a direction of arrow 798) to engage the second and third passenger restraints 783, 786 and cannot be moved in the fourth direction or sixth direction (e.g., in a direction of arrow 799) to disengage the second and third passenger restraints 783, 786, passengers of a second row and a third row of the ride vehicle may not inadvertently or intentionally disengage the second and third passenger restraints 783, 786. In some examples, the first switchable valve 726 may remain in the ON state when the ride vehicle is in operation, which may enable passengers to further engage the first, second and/or third passenger restraints 780, 783, 786 (e.g., move the lap bars 781, 782, 784, 785, 787, 788 closer to the passenger(s)) during operation of the ride vehicle.

When the second switchable valve 728 is in an ON state (e.g., where the first port 742 is connected to the second port 744 to enable fluid flow between the first and second ports 742, 744, where the third port 746 is connected to the fourth port 748 to enable fluid flow between the third and fourth ports 746, 748, and where the fifth port 750 is connected to the sixth port 752 to enable fluid flow between the fifth and sixth ports 750, 752), the first, second, and third movable elements 704, 712, 720 may be independently moved. For example, the movable element 704 may be moved in the first direction (e.g., in a direction of arrow 798) or the second direction (e.g., in a direction of arrow 799), the movable element 712 may be moved in the third direction (e.g., in a direction of arrow 798) or in the fourth direction (e.g., in a direction of arrow 799), and the movable element 720 may be moved in the fifth direction (e.g., in a direction of arrow 798) or in the sixth direction (e.g., in a direction of arrow 799).

When the second switchable valve 728 is in an ON state, the first, second, and third one-way valves 732, 734, 736 are bypassed via the second switchable valve 728. This enables fluid to freely flow between the first and second fluid chambers 706, 708 of the first fluid powered actuator 702, enables fluid to freely flow between the first and second fluid chambers 714, 716 of the second fluid powered actuator 710, and enables fluid to freely flow between the first and second fluid chambers 722, 724 of the third fluid powered actuator 718.

When the third switchable valve 730 is in an ON state (e.g., where the first port 754 is connected to the second port 756 to enable fluid flow between the first and second ports 754, 756, where the third port 758 is connected to the fourth port 760 to enable fluid flow between the third and fourth ports 758, 760, and where the fifth port 762 is connected to the sixth port 764 to enable fluid flow between the fifth and sixth ports 762, 764), the first, second, and third movable elements 704, 712, 720 may be independently moved. For example, the movable element 704 may be moved in the first direction (e.g., in a direction of arrow 798) or the second direction (e.g., in a direction of arrow 799), the movable element 712 may be moved in the third direction (e.g., in a direction of arrow 798) or in the fourth direction (e.g., in a direction of arrow 799), and the movable element 720 may be moved in the fifth direction (e.g., in a direction of arrow 798) or in the sixth direction (e.g., in a direction of arrow 799).

When the third switchable valve 730 is in an ON state, the first, second, and third one-way valves 732, 734, 736 are bypassed via the third switchable valve 730. This enables fluid to freely flow between the first and second fluid chambers 706, 708 of the first fluid powered actuator 702, enables fluid to freely flow between the first and second fluid chambers 714, 716 of the second fluid powered actuator 710, and enables fluid to freely flow between the first and second fluid chambers 722, 724 of the third fluid powered actuator 718.

When the first switchable valve 726 is in an OFF state (e.g., fluid is not allowed to flow between the first and second ports 738, 740) and the second and third switchable valves 728, 730 are also in the OFF state, fluid cannot flow between the first and second fluid chambers 706, 708 of the first fluid powered actuator 702, fluid cannot flow between the first and second fluid chambers 714, 716 of the second fluid powered actuator 710, and fluid cannot flow between the first and second fluid chambers 722, 724 of the third fluid powered actuator 718. Therefore, the movable elements 704, 712, 720 and the first, second, and third passenger restraints 780, 783, 786 may not move. In some implementations, the first switchable valve 726 may be maintained in the OFF state to lock the movable elements 704, 712, 720 and the first, second, and third passenger restraints 780, 783, 786 in their current positions.

In some scenarios, the first switchable valve 726 may be maintained in the OFF state when the first, second, and third passenger restraints 780, 783, 786 are disengaged (e.g., when the first, second and third movable elements 704, 712, 720 are fully or partially retracted) to facilitate loading and/or unloading of passengers from the ride vehicle. This may prevent inadvertent or intentional engagement of the first, second, and third passenger restraints 780, 783, 786 during loading and/or unloading of passengers from the ride vehicle.

In some aspects, an assistance mechanism may be coupled to the first, second and/or third fluid powered actuator 702, 710, 718. For example, a first assistance mechanism 703 may be coupled to the first fluid powered actuator 702, a second assistance mechanism 707 may be coupled to the second fluid powered actuator 710, and a third assistance mechanism 711 may be coupled to the third fluid powered actuator 718. In one nonlimiting example, the assistance mechanism 703, 707, 711 may include a coil spring mechanism or a gas spring mechanism (also referred to as a gas strut). For example, the first assistance mechanism 703 may include a rod 705 and a coil 719, where the rod 705 may move in the first or second direction. The rod 705 may be configured to extend in the first direction (e.g., in a direction of arrow 798) and retract in the second direction (e.g., in a direction of arrow 799). The rod 705 may retract with a force provided by a coil 719 to facilitate disengagement of the first passenger restraint 780. Similarly, rod 709 of the second assistance mechanism 707 and rod 713 of the third assistance mechanism 711 may retract with a force provided by a coil to facilitate disengagement of the second and third passenger restraints 783, 786.

Figure 8:
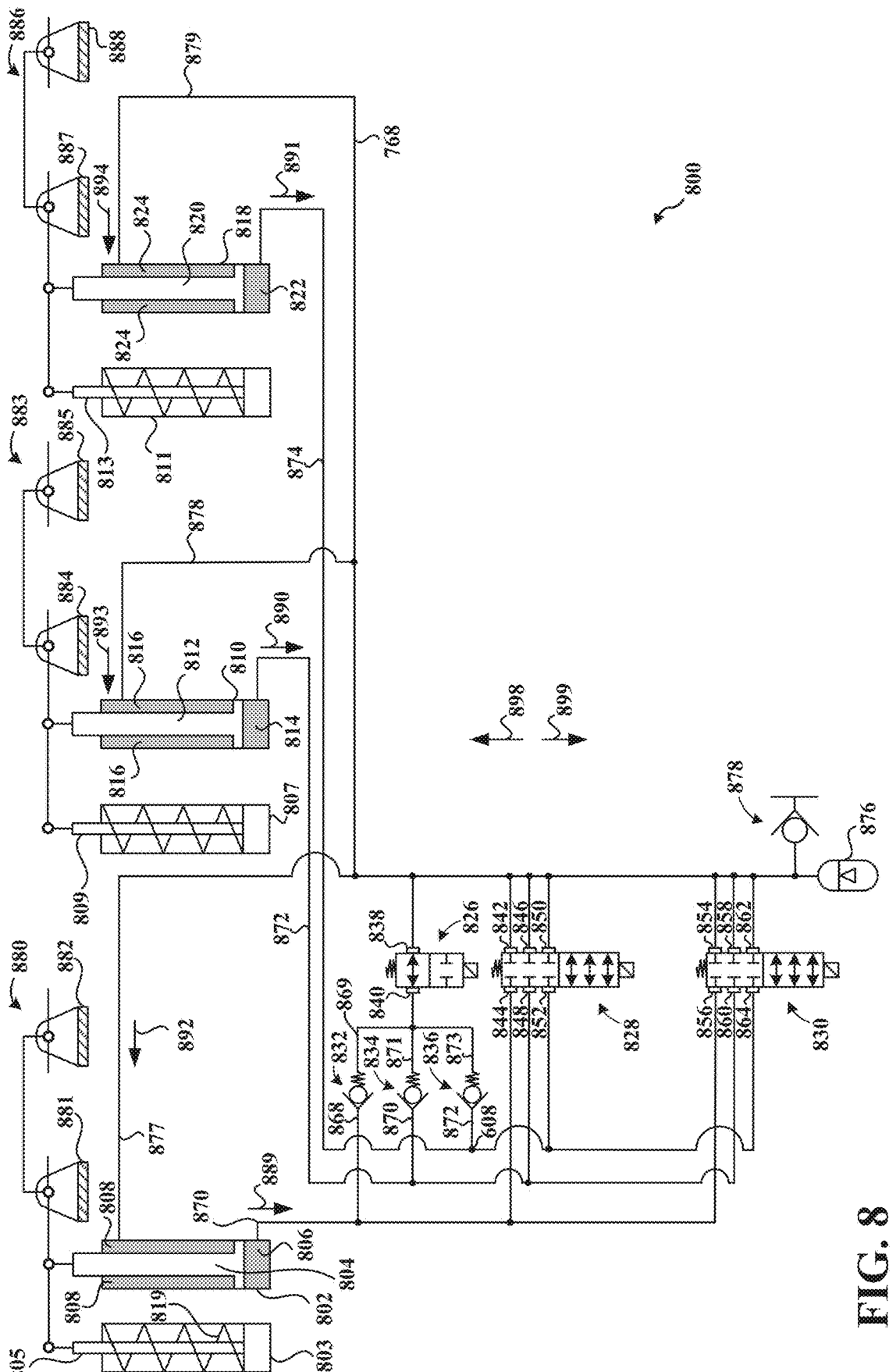
FIG. 8 illustrates operation of a passenger restraint apparatus for controlling one or more fluid powered actuators in accordance with various aspects of the disclosure.

FIG. 8 illustrates operation of a passenger restraint apparatus 800 in accordance with various aspects. The passenger restraint apparatus 800 includes a first fluid powered actuator 802, a second fluid powered actuator 810, a third fluid powered actuator 818, a first one-way valve 832, a second one-way valve 834, a third one-way valve 836, a fourth one-way valve 878, a first switchable valve 826, a second switchable valve 828, a third switchable valve 830, a fluid accumulator 876, a first passenger restraint 880, a second passenger restraint 883, and a third passenger restraint 886.

The first fluid powered actuator 802 includes a movable element 804, a first fluid chamber 806 and a second fluid chamber 808. The movable element 804 is configured to move in a first direction (e.g., in a direction of arrow 898) when a fluid flows into the first fluid chamber 806 or in a second direction (e.g., in a direction of arrow 899) when the fluid flows into the second fluid chamber 808.

The second fluid powered actuator 810 includes a movable element 812, a first fluid chamber 814 and a second fluid chamber 816. The movable element 812 is configured to move in a third direction (e.g., in a direction of arrow 898) when the fluid flows into the first fluid chamber 814 or in a fourth direction (e.g., in a direction of arrow 899) when the fluid flows into the second fluid chamber 816.

The third fluid powered actuator 818 includes a movable element 820, a first fluid chamber 822 and a second fluid chamber 824. The movable element 820 is configured to move in a fifth direction (e.g., in a direction of arrow 898) when the fluid flows into the first fluid chamber 822 or in a sixth direction (e.g., in a direction of arrow 899) when the fluid flows into the second fluid chamber 824.

The first switchable valve 826 may be implemented as a two-way valve, such as the two-way valve 100 described with reference to FIGS. 1A through IC. The first switchable valve 826 includes multiple ports, such as a first port 838 and a second port 840. The first port 838 is coupled to the second fluid chamber 808 of the first fluid powered actuator 802, the second fluid chamber 816 of the second fluid powered actuator 810, and the second fluid chamber 824 of the third fluid powered actuator 818. The second port 840 is coupled to the first fluid chamber 806 of the first fluid powered actuator 802 via the first one-way valve 832. The second port 840 is further coupled to the first fluid chamber 814 of the second fluid powered actuator 810 via the second one-way valve 834. The second port 840 is further coupled to the first fluid chamber 822 of the third fluid powered actuator 818 via the third one-way valve 836.

The second switchable valve 828 may be implemented as a six-way valve and may include multiple ports, such as a first port 842, a second port 844, a third port 846, a fourth port 848, a fifth port 850, and a sixth port 852. The first port 842, the third port 846, and the fifth port 850 are all coupled to the second fluid chamber 808 of the first fluid powered actuator 802, the second fluid chamber 816 of the second fluid powered actuator 810, and the second fluid chamber 824 of the third fluid powered actuator 818. The second port 844 is coupled to the first fluid chamber 806 of the first fluid powered actuator 802. The fourth port 848 is coupled to the first fluid chamber 814 of the second fluid powered actuator 810. The sixth port 852 is coupled to the first fluid chamber 822 of the third fluid powered actuator 818. As shown and described, the second switchable valve 828 is implemented as a six-way valve to accommodate the presence of three fluid powered actuators (e.g., first, second, and third fluid powered actuators 802, 810, and 818) in the apparatus 800. However, it is contemplated that the second switchable valve 828 may be implemented as any type of valve suitable to accommodate the number of fluid powered actuators present in the apparatus 800. For example, the second switchable valve 828 may be implemented as an eight-way valve to accommodate the presence of four fluid powered actuators, as a ten-way valve to accommodate the presence of five fluid powered actuators, etc.

The third switchable valve 830 may be implemented as a six-way valve and may include multiple ports, such as a first port 854, a second port 856, a third port 858, a fourth port 860, a fifth port 862, and a sixth port 864. The first port 854, the third port 858, and the fifth port 862 are all coupled to the second fluid chamber 808 of the first fluid powered actuator 802, the second fluid chamber 816 of the second fluid powered actuator 810, and the second fluid chamber 824 of the third fluid powered actuator 818. The second port 856 is coupled to the first fluid chamber 806 of the first fluid powered actuator 802. The fourth port 860 is coupled to the first fluid chamber 814 of the second fluid powered actuator 810. The sixth port 864 is coupled to the first fluid chamber 822 of the third fluid powered actuator 818. As shown and described, the third switchable valve 830 is implemented as a six-way valve to accommodate the presence of three fluid powered actuators (e.g., first, second, and third fluid powered actuators 802, 810, and 818) in the apparatus 800. However, it is contemplated that the third switchable valve 830 may be implemented as any type of valve suitable to accommodate the number of fluid powered actuators present in the apparatus 800. For example, the third switchable valve 830 may be implemented as an eight-way valve to accommodate the presence of four fluid powered actuators, as a ten-way valve to accommodate the presence of five fluid powered actuators, etc.

The second fluid chamber 808 of the first fluid powered actuator 802, the second fluid chamber 816 of the second fluid powered actuator 810, and the second fluid chamber 824 of the third fluid powered actuator 818 are coupled to the fluid accumulator 876 and the fourth one-way valve 878. The fluid accumulator 876 may be a device for storing a fluid under pressure and releasing the fluid as needed with a proper (e.g., consistent) flow. The fourth one-way valve 878 may serve as a test port to enable an operator to fill fluid, monitor, measure, and/or test a pressure or a condition of the fluid.

When the first switchable valve 826 is in an ON state (e.g., fluid is enabled to flow between the first and second ports 838, 840), the first one-way valve 832 may enable movement of the movable element 804 in the second direction (e.g., in a direction of arrow 899) and may prevent movement of the movable element 804 in the first direction (e.g., in a direction of arrow 898). For example, when the movable element 804 is moved in the second direction (e.g., in a direction of arrow 899), fluid may flow out of the first fluid chamber 806 of the first fluid powered actuator 802 through a fluid path 870 (as indicated with arrow 889) and may flow into the second fluid chamber 808 of the first fluid powered actuator 802 through a fluid path 877 (as indicated with arrow 892). In this scenario, the first one-way valve 832 will enable fluid flow from an inlet fluid path 868 to an outlet fluid path 869.

It should be noted that the movable element 804 cannot be moved in the first direction (e.g., in a direction of arrow 898) when the first switchable valve 826 is in an ON state and the second switchable valve 828 and the third switchable valve 830 are in an OFF state. For example, since the first one-way valve 832 will not allow fluid flow from the outlet fluid path 869 to the inlet fluid path 868, the first one-way valve 832 prevents fluid flow into the first fluid chamber 806, and consequently, out of the second fluid chamber 808 of the first fluid powered actuator 802. The movable element 804 cannot be moved in the first direction (e.g., in a direction of arrow 898) if fluid cannot flow out of the second fluid chamber 808 of the first fluid powered actuator 802.

The movable element 804 may be moved in the second direction (e.g., in a direction of arrow 899) until full retraction of the movable element 804 is achieved. The movable element 804 may be moved in the second direction (e.g., in a direction of arrow 899) independently of the movable elements 812, 820 of the second fluid powered actuator 810 and the third fluid powered actuator 818.

When the first switchable valve 826 is in an ON state (e.g., fluid is enabled to flow between the first and second ports 838, 840), the second one-way valve 834 may enable movement of the movable element 812 of the second fluid powered actuator 810 in the fourth direction (e.g., in a direction of arrow 899) and may prevent movement of the movable element 812 in the third direction (e.g., in a direction of arrow 898). For example, when the movable element 812 is moved in the fourth direction (e.g., in a direction of arrow 899), fluid may flow out of the first fluid chamber 814 of the second fluid powered actuator 810 through a fluid path 872 (as indicated with arrow 890) and may flow into the second fluid chamber 816 of the second fluid powered actuator 810 through a fluid path 878 (as indicated with arrow 893). In this scenario, the second one-way valve 834 will enable fluid flow from an inlet fluid path 870 to an outlet fluid path 871.

It should be noted that the movable element 812 cannot be moved in the third direction (e.g., in a direction of arrow 898) when the first switchable valve 826 is in an ON state and the second switchable valve 828 and the third switchable valve 830 are in an OFF state. For example, since the second one-way valve 834 will not allow fluid flow from the outlet fluid path 871 to the inlet fluid path 870, the second one-way valve 834 prevents fluid flow into the first fluid chamber 814, and consequently, out of the second fluid chamber 816 of the second fluid powered actuator 810. The movable element 812 cannot be moved in the third direction (e.g., in a direction of arrow 898) if fluid cannot flow out of the second fluid chamber 816 of the second fluid powered actuator 810.

The movable element 812 may be moved in the fourth direction (e.g., in a direction of arrow 899) until full retraction of the movable element 812 is achieved. The movable element 812 may be moved in the fourth direction (e.g., in a direction of arrow 899) independently of the movable elements 804, 820 of the first fluid powered actuator 802 and the third fluid powered actuator 818.

When the first switchable valve 826 is in an ON state (e.g., fluid is enabled to flow between the first and second ports 838, 840), the third one-way valve 836 may enable movement of the movable element 820 of the third fluid powered actuator 818 in the sixth direction (e.g., in a direction of arrow 899) and may prevent movement of the movable element 820 in the fifth direction (e.g., in a direction of arrow 898). For example, when the movable element 820 is moved in the sixth direction (e.g., in a direction of arrow 899), fluid may flow out of the first fluid chamber 822 of the third fluid powered actuator 818 through a fluid path 874 (as indicated with arrow 891) and may flow into the second fluid chamber 824 of the third fluid powered actuator 818 through a fluid path 879 (as indicated with arrow 894). In this scenario, the third one-way valve 836 will enable fluid flow from an inlet fluid path 872 to an outlet fluid path 873.

It should be noted that the movable element 820 cannot be moved in the fifth direction (e.g., in a direction of arrow 898) when the first switchable valve 826 is in an ON state and the second switchable valve 828 and the third switchable valve 830 are in an OFF state. For example, since the third one-way valve 836 will not allow fluid flow from the outlet fluid path 873 to the inlet fluid path 872, the third one-way valve 836 prevents fluid flow into the first fluid chamber 822, and consequently, out of the second fluid chamber 824 of the third fluid powered actuator 818. The movable element 820 cannot be moved in the fifth direction (e.g., in a direction of arrow 898) if fluid cannot flow out of the second fluid chamber 824 of the third fluid powered actuator 818.

The movable element 820 may be moved in the sixth direction (e.g., in a direction of arrow 899) until full retraction of the movable element 820 is achieved. The movable element 820 may be moved in the sixth direction (e.g., in a direction of arrow 899) independently of the movable elements 804, 812 of the first fluid powered actuator 802 and the second fluid powered actuator 810.

In some implementations, the first passenger restraint 880 may include one or more lap bars for a first row in a ride vehicle, such as a first lap bar 881 and/or a second lap bar 882. The second passenger restraint 883 may include one or more lap bars for a second row in the ride vehicle, such as a first lap bar 884 and/or a second lap bar 885. The third passenger restraint 886 may include one or more lap bars for a third row in the ride vehicle, such as a first lap bar 887 and/or a second lap bar 888.

In some examples, the first passenger restraint 880 is engaged when the movable element 804 is moved in the second direction (e.g., in a direction of arrow 899) until passengers are secured or until full retraction of the movable element 812 is achieved. In some examples, the second passenger restraint 883 is engaged when the movable element 812 is moved in the fourth direction (e.g., in a direction of arrow 899) until passengers are secured or until full retraction of the movable element 812 is achieved. In some examples, the third passenger restraint 886 is engaged when the movable element 820 is moved in the sixth direction (e.g., in a direction of arrow 899) until passengers are secured or until full retraction of the movable element 820 is achieved.

During operation of the passenger restraint apparatus 800 when the first switchable valve 826 is in the ON state, since the movable element 804 of the first fluid powered actuator 802 is enabled to move in the second direction (e.g., in a direction of arrow 899) to engage the first passenger restraint 880 and cannot be moved in the first direction (e.g., in a direction of arrow 898) to disengage the first passenger restraint 880, passengers in a first row of a ride vehicle may not inadvertently or intentionally disengage the first passenger restraint 880. Similarly, since the movable element 812 of the second fluid powered actuator 810 is enabled to move in the fourth direction (e.g., in a direction of arrow 899) to engage the second passenger restraint 883 and cannot be moved in the third direction (e.g., in a direction of arrow 898) to disengage the second passenger restraint 883, passengers of a second row of the ride vehicle may not inadvertently or intentionally disengage the second passenger restraint 883. Also, since the movable element 820 of the third fluid powered actuator 818 is enabled to move in the sixth direction (e.g., in a direction of arrow 899) to engage the third passenger restraint 886 and cannot be moved in the fifth direction (e.g., in a direction of arrow 898) to disengage the third passenger restraint 886, passengers in a third row of a ride vehicle may not inadvertently or intentionally disengage the third passenger restraint 886.

In some examples, the first switchable valve 826 may remain in the ON state when the ride vehicle is in operation, which may enable passengers to further engage the first, second, and/or third passenger restraints 880, 883, 886 (e.g., move the lap bars 881, 882, 884, 885, 887, 888) closer to the passenger(s)) during operation of the ride vehicle.

When the second switchable valve 828 is in an ON state (e.g., where the first port 842 is connected to the second port 844 to enable fluid flow between the first and second ports 842, 844, where the third port 846 is connected to the fourth port 848 to enable fluid flow between the third and fourth ports 846, 848, and where the fifth port 850 is connected to the sixth port 852 to enable fluid flow between the fifth and sixth ports 850, 852), the first, second, and third movable elements 804, 812, 820 may be independently moved. For example, the movable element 804 may be moved in the first direction (e.g., in a direction of arrow 898) or the second direction (e.g., in a direction of arrow 899), the movable element 812 may be moved in the third direction (e.g., in a direction of arrow 898) or in the fourth direction (e.g., in a direction of arrow 899), and the movable element 820 may be moved in the fifth direction (e.g., in a direction of arrow 898) or in the sixth direction (e.g., in a direction of arrow 899).

When the second switchable valve 828 is in an ON state, the first, second, and third one-way valves 832, 834, 836 are bypassed via the second switchable valve 828. This enables fluid to freely flow between the first and second fluid chambers 806, 808 of the first fluid powered actuator 802, enables fluid to freely flow between the first and second fluid chambers 814, 816 of the second fluid powered actuator 810, and enables fluid to freely flow between the first and second fluid chambers 822, 824 of the third fluid powered actuator 818.

When the third switchable valve 830 is in an ON state (e.g., where the first port 854 is connected to the second port 856 to enable fluid flow between the first and second ports 854, 856, where the third port 858 is connected to the fourth port 860 to enable fluid flow between the third and fourth ports 858, 860, and where the fifth port 862 is connected to the sixth port 864 to enable fluid flow between the fifth and sixth ports 862, 864), the first, second, and third movable elements 804, 812, 820 may be independently moved. For example, the movable element 804 may be moved in the first direction (e.g., in a direction of arrow 898) or the second direction (e.g., in a direction of arrow 899), the movable element 812 may be moved in the third direction (e.g., in a direction of arrow 898) or in the fourth direction (e.g., in a direction of arrow 899), and the movable element 820 may be moved in the fifth direction (e.g., in a direction of arrow 898) or in the sixth direction (e.g., in a direction of arrow 899).

When the third switchable valve 830 is in an ON state, the first, second, and third one-way valves 832, 834, 836 are bypassed via the third switchable valve 830. This enables fluid to freely flow between the first and second fluid chambers 806, 808 of the first fluid powered actuator 802, enables fluid to freely flow between the first and second fluid chambers 814, 816 of the second fluid powered actuator 810, and enables fluid to freely flow between the first and second fluid chambers 822, 824 of the third fluid powered actuator 818.

When the first switchable valve 826 is in an OFF state (e.g., fluid is not allowed to flow between the first and second ports 838, 840) and the second and third switchable valves 828, 830 are also in the OFF state, fluid cannot flow between the first and second fluid chambers 806, 808 of the first fluid powered actuator 802, fluid cannot flow between the first and second fluid chambers 814, 816 of the second fluid powered actuator 810, and fluid cannot flow between the first and second fluid chambers 822, 824 of the third fluid powered actuator 818. Therefore, the movable elements 804, 812, 820 and the first, second, and third passenger restraints 880, 883, and 886 may not move. In some implementations, the first switchable valve 826 may be maintained in the OFF state to lock the movable elements 804, 812, 820 and the first, second, and third passenger restraints 880, 883, and 886 in their current positions.

In some scenarios, the first switchable valve 826 may be maintained in the OFF state when the first, second, and third passenger restraints 880, 883, 886 are disengaged (e.g., when the first, second, and third movable elements 804, 812, 820 are fully or partially extended) to facilitate loading and/or unloading of passengers from the ride vehicle. This may prevent inadvertent or intentional engagement of the first, second, and third passenger restraints 880, 883, 886 during loading and/or unloading of passengers from the ride vehicle.

In some aspects, an assistance mechanism may be coupled to the first, second and/or third fluid powered actuator 802, 810, 818. For example, a first assistance mechanism 803 may be coupled to the first fluid powered actuator 802, a second assistance mechanism 807 may be coupled to the second fluid powered actuator 810, and a third assistance mechanism 811 may be coupled to the third fluid powered actuator 818. In one nonlimiting example, the assistance mechanism 803, 807, 811 may include a coil spring mechanism or a gas spring mechanism (also referred to as a gas strut). For example, the assistance mechanism 803 may include a rod 805 and a coil 819, where the rod 805 may move in the first or second direction. The rod 805 may be configured to extend in the first direction (e.g., in a direction of arrow 898) and retract in the second direction (e.g., in a direction of arrow 899). The rod 805 may retract with a force provided by the coil 819 to facilitate disengagement of the first passenger restraint 880. Similarly, rod 809 of the second assistance mechanism 807 and rod 813 of the third assistance mechanism 811 may retract with a force provided by a coil to facilitate disengagement of the second and third passenger restraints 883, 886.

Figure 9A:
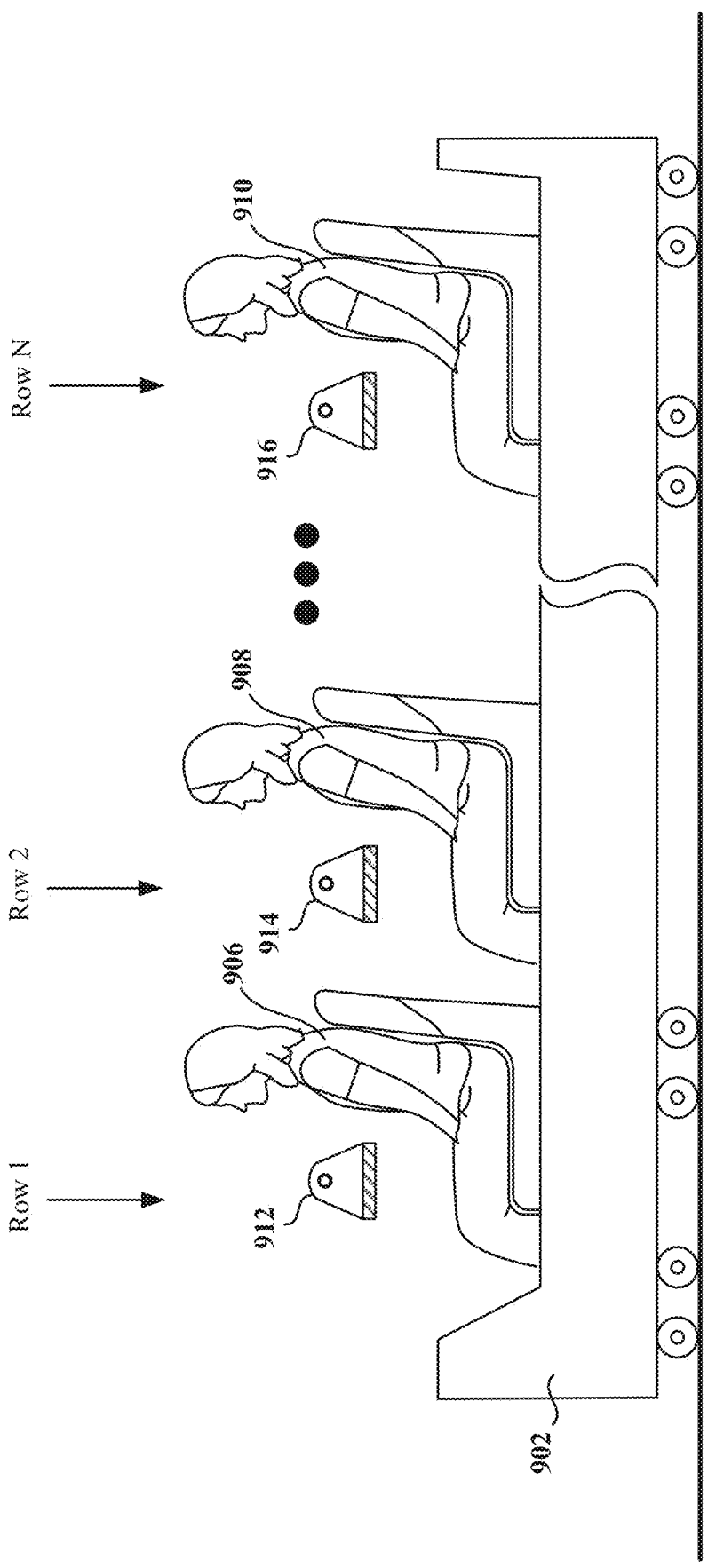
FIGS. 9A and 9B illustrate an example ride vehicle implementing a passenger restraint apparatus in accordance with various aspects of the disclosure.
Figure 9B:
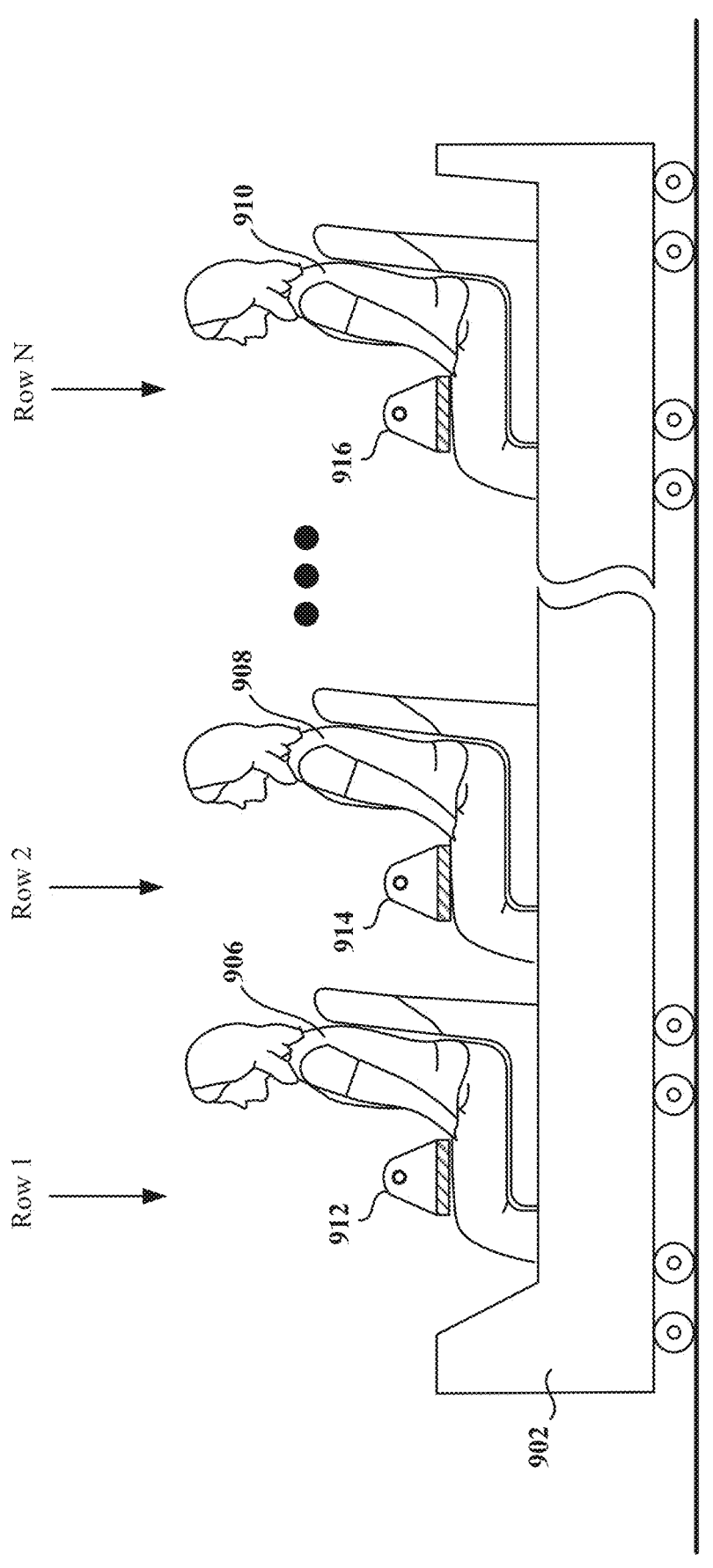

FIGS. 9A and 9B illustrate an example ride vehicle 902 implementing a passenger restraint apparatus in accordance with various aspects of the disclosure. The ride vehicle 902 may include one or more seat rows, e.g., a first seat row (Row 1), a second seat row (Row 2), through an N-th seat row (Row N) where N is an integer greater than 2. Each seat row may include one or more seats to accommodate one or more passengers. In the example shown, the first seat row may accommodate a first passenger 906, the second seat row may accommodate a second passenger 908, and the N-th seat row may accommodate a third passenger 910. Passengers of the ride vehicle 902 may be secured to a seat of the ride vehicle 902 via any passenger restraint apparatus described above in accordance with various aspects. During operation of a passenger restraint apparatus, one or more movable elements of one or more fluid powered actuators may be moved to engage (or disengage) passenger restraints/lap bars onto (or from) passenger bodies. For example, as shown in FIG. 9A, the one or more movable elements of the one or more fluid power actuators may be moved to disengage the lap bars 912, 914, 916 from the passengers 906, 908, 910 to allow the passengers to enter or exit the ride vehicle 902. As shown in FIG. 9B, the one or more movable elements of the one or more fluid power actuators may be moved to engage the lap bars 912, 914, 916 onto the passengers 906, 908, 910 to secure the passengers to their respective seats inside the ride vehicle 902.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object.

One or more of the components, steps, features and/or functions illustrated in FIGS. 1A-9B may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1A-9B may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

What is claimed is:

1. An apparatus, comprising:
    a plurality of fluid powered actuators, wherein each fluid powered actuator of the plurality of fluid powered actuators includes a movable element, a first fluid chamber and a second fluid chamber, wherein the movable element is configured to move in a first direction when a fluid flows into the first fluid chamber or in a second direction when the fluid flows into the second fluid chamber;
    a first switchable valve including at least a first port and a second port, wherein the first port is coupled to the first fluid chamber of each fluid powered actuator of the plurality of fluid powered actuators, and wherein the second port is coupled to the second fluid chamber of each fluid powered actuator of the plurality of fluid powered actuators via separate one-way valves to enable movement of the movable element of each fluid powered actuator of the plurality of fluid powered actuators in the first direction and to prevent movement of the movable element of each fluid powered actuator of the plurality of fluid powered actuators in the second direction when the first switchable valve is in an ON state; and
    a second switchable valve including a third port and a fourth port, wherein the third port is coupled to the first fluid chamber of each fluid powered actuator of the plurality of fluid powered actuators, wherein the fourth port is coupled to the second fluid chamber of at least one fluid powered actuator of the plurality of fluid powered actuators, and wherein the second switchable valve enables movement of the movable element of the at least one fluid powered actuator of the plurality of fluid powered actuators in the second direction when the second switchable valve is in the ON state.

2. The apparatus of claim 1, wherein the first switchable valve prevents movement of the movable element in the first direction and the second direction when the first switchable valve is in an OFF state.

3. The apparatus of claim 1, wherein the second switchable valve further comprises at least a fifth port and a sixth port, wherein the fifth port is coupled to the first fluid chamber of each fluid powered actuator, wherein the fourth port is coupled to the second fluid chamber of the at least one fluid powered actuator of the plurality of fluid powered actuators, wherein the sixth port is coupled to the second fluid chamber of an additional at least one fluid powered actuator of the plurality of fluid powered actuators, and wherein the second switchable valve enables movement of the respective movable element of the at least one fluid powered actuator of the plurality of fluid power actuators and the additional at least one fluid powered actuator of the plurality of fluid powered actuators in the second direction when the second switchable valve is in the ON state.

4. The apparatus of claim 3, wherein the fluid is enabled to flow between the third port and the fourth port and enabled to flow between the fifth port and the sixth port when the second switchable valve is in the ON state.

5. The apparatus of claim 3, further comprising an assistance mechanism coupled to the respective movable element of one or more fluid powered actuators of the plurality of fluid powered actuators, wherein the assistance mechanism is configured to provide a force in the second direction.

6. The apparatus of claim 1, wherein one or more movable elements are coupled to one or more passenger restraints of a ride vehicle.

7. The apparatus of claim 6, wherein the movement of the movable element in the first direction engages the one or more corresponding passenger restraints, and wherein the movement of the movable element in the second direction disengages the one or more corresponding passenger restraints.

8. The apparatus of claim 6, wherein the movement of the movable element in the first direction disengages the one or more corresponding passenger restraints, and wherein the movement of the movable element in the second direction engages the one or more corresponding passenger restraints.

9. The apparatus of claim 1, wherein the movement of the movable element of one fluid powered actuator of the plurality of fluid powered actuators does not cause the movement of any other movable element of the other fluid powered actuators of the plurality of fluid powered actuators.

10. The apparatus of claim 1, further comprising a third switchable valve including at least a fifth port, a sixth port, a seventh port, and an eighth port, wherein the fifth port and the seventh port are both coupled to the first fluid chamber of each fluid powered actuator, wherein the sixth port is coupled to the second fluid chamber of at least a first fluid powered actuator of the plurality of fluid powered actuators, wherein the eighth port is coupled to the second fluid chamber of at least a second fluid powered actuator of the plurality of fluid powered actuators, and wherein the third switchable valve enables movement of the movable element of at least the first fluid powered actuator and the second fluid powered actuator of the plurality of fluid powered actuators in the second direction when the third switchable valve is in the ON state.

11. An apparatus, comprising:
a first fluid powered actuator including a first movable element, a first fluid chamber and a second fluid chamber, wherein the first movable element is configured to move in a first direction when a fluid flows into the first fluid chamber or in a second direction when the fluid flows into the second fluid chamber;
a second fluid powered actuator including a second movable element, a third fluid chamber and a fourth fluid chamber, wherein the second movable element is configured to move in a third direction when the fluid flows into the third fluid chamber or in a fourth direction when the fluid flows into the fourth fluid chamber;
a first switchable valve including at least a first port and a second port, wherein the first port is coupled to the first fluid chamber and the third fluid chamber, wherein the second port is coupled to the second fluid chamber via a first one-way valve to enable movement of the first movable element in the first direction and to prevent movement of the first movable element in the second direction when the first switchable valve is in an ON state, and wherein the second port is further coupled to the fourth fluid chamber via a second one-way valve to enable movement of the second movable element in the third direction and to prevent movement of the second movable element in the fourth direction when the first switchable valve is in the ON state; and
a second switchable valve including at least a third port and a fourth port, wherein the third port is coupled to the first fluid chamber and the third fluid chamber to enable movement of the first movable element in the first direction and the second movable element in the third direction when the second switchable valve is in the ON state, wherein the fourth port is coupled to at least the second fluid chamber, and where the second switchable valve enables movement of the first movable element in the second direction when the second switchable valve is in the ON state despite the ON state of the first switchable valve.

12. The apparatus of claim 11, wherein the first switchable valve prevents movement of the first movable element in the first direction and the second direction and prevents movement of the second movable element in the third direction and the fourth direction when the first switchable valve is in an OFF state.

13. The apparatus of claim 11, wherein the second switchable valve further comprises at least a fifth port and a sixth port, wherein the fifth port is coupled to the first fluid chamber and the third fluid chamber, wherein the sixth port is coupled to the fourth fluid chamber, and wherein the second switchable valve enables movement of the second movable element in the fourth direction when the second switchable valve is in the ON state.

14. The apparatus of claim 13, wherein the fluid is enabled to flow between the third port and the fourth port and enabled to flow between the fifth port and the sixth port when the second switchable valve is in the ON state.

15. The apparatus of claim 13, further comprising an assistance mechanism coupled to the first movable element or the second movable element, wherein the assistance mechanism is configured to provide a force in the second direction or the fourth direction.

16. The apparatus of claim 11, wherein at least one of the first movable element or the second movable element is coupled to one or more passenger restraints of a ride vehicle.

17. The apparatus of claim 11, wherein the first movable element is coupled to one or more first passenger restraints of a ride vehicle, and wherein the second movable element is coupled to one or more second passenger restraints of the ride vehicle.

18. The apparatus of claim 17, wherein the movement of the first movable element in the first direction engages the one or more first passenger restraints and the movement of the first movable element in the second direction disengages the one or more first passenger restraints, and wherein the movement of the second movable element in the third direction engages the one or more second passenger restraints and the movement of the second movable element in the fourth direction disengages the one or more second passenger restraints.

19. The apparatus of claim 17, wherein the movement of the first movable element in the first direction disengages the one or more first passenger restraints and the movement of the first movable element in the second direction engages the one or more first passenger restraints, and wherein the movement of the second movable element in the third direction disengages the one or more second passenger restraints and the movement of the second movable element in the fourth direction engages the one or more second passenger restraints.

20. The apparatus of claim 11, wherein the movement of the first movable element does not cause the movement of the second movable element, and wherein the movement of the second movable element does not cause the movement of the first movable element.

\* \* \* \* \*